United States Patent
Chien et al.

(10) Patent No.: US 9,699,456 B2
(45) Date of Patent: Jul. 4, 2017

(54) BUFFERING PREDICTION DATA IN VIDEO CODING

(75) Inventors: Wei-Jung Chien, San Diego, CA (US); Yunfei Zheng, Cupertino, CA (US); Xianglin Wang, San Diego, CA (US); Marta Karczewicz, San Diego, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1068 days.

(21) Appl. No.: 13/550,377

(22) Filed: Jul. 16, 2012

(65) Prior Publication Data

US 2013/0022119 A1 Jan. 24, 2013

Related U.S. Application Data

(60) Provisional application No. 61/509,933, filed on Jul. 20, 2011, provisional application No. 61/522,136, filed on Aug. 10, 2011.

(51) Int. Cl.
*H04N 7/26* (2006.01)
*H04N 7/32* (2006.01)
(Continued)

(52) U.S. Cl.
CPC ........... *H04N 19/11* (2014.11); *H04N 19/147* (2014.11); *H04N 19/159* (2014.11);
(Continued)

(58) Field of Classification Search
CPC .. H04N 19/159; H04N 19/176; H04N 19/147; H04N 19/11; H04N 19/51; H04N 19/593; H04N 19/46
(Continued)

(56) References Cited

U.S. PATENT DOCUMENTS 6,426,976 B1    7/2002   Wen et al.
7,236,524 B2    6/2007   Sun et al.
(Continued)

FOREIGN PATENT DOCUMENTS

CN    101127902 A    2/2008
CN    101981934 A    2/2011
(Continued)

OTHER PUBLICATIONS

Guo, et al., "Intra Chroma LM Mode with Reduced Line Buffer," Joint Collaborative Team on Video Coding (JCT-VC) of ITU-T SG16 WP3 and ISO/IEC JTC1/SC29/WG11 JCTVC-F121, Jul. 16, 2011, 4 pp.
(Continued)

*Primary Examiner* — Gims Philippe
*Assistant Examiner* — On S Mung

(57) ABSTRACT

In an example, aspects of this disclosure relate to a method of coding video data that generally includes determining prediction information for a block of video data, where the block is included in a coded unit of video data and positioned below a top row of above-neighboring blocks in the coded unit, and where the prediction information for the block is based on prediction information from one or more other blocks in the coded unit but not based on prediction information from any of the top row of blocks in the coded unit. The method also generally includes coding the block based on the determined prediction information.

30 Claims, 18 Drawing Sheets

(51) Int. Cl.
  *H04N 19/11*   (2014.01)
  *H04N 19/159*  (2014.01)
  *H04N 19/176*  (2014.01)
  *H04N 19/147*  (2014.01)
  *H04N 19/46*   (2014.01)
  *H04N 19/51*   (2014.01)
  *H04N 19/593*  (2014.01)

(52) U.S. Cl.
  CPC ........... *H04N 19/176* (2014.11); *H04N 19/46* (2014.11); *H04N 19/51* (2014.11); *H04N 19/593* (2014.11)

(58) Field of Classification Search
  USPC ............. 375/240.12, 240.24–240.26, 240.16
  See application file for complete search history.

(56) References Cited

U.S. PATENT DOCUMENTS

| | | | |
|---|---|---|---|
| 7,289,674 | B2 | 10/2007 | Karczewicz |
| 7,903,735 | B2 | 3/2011 | Cha et al. |
| 8,369,404 | B2 | 2/2013 | Sekiguchi et al. |
| 9,036,702 | B2 | 5/2015 | Yang et al. |
| 2006/0140275 | A1 | 6/2006 | Lee et al. |
| 2006/0276227 | A1 | 12/2006 | Dravida |
| 2007/0019726 | A1* | 1/2007 | Cha et al. ................ 375/240.12 |
| 2008/0043842 | A1 | 2/2008 | Nakaishi |
| 2008/0159394 | A1 | 7/2008 | Lee |
| 2008/0310507 | A1 | 12/2008 | Ye et al. |
| 2009/0175334 | A1* | 7/2009 | Ye ........................ H04N 19/105 375/240.12 |
| 2009/0245349 | A1* | 10/2009 | Zhao et al. ............. 375/240.03 |
| 2010/0040140 | A1 | 2/2010 | Marpe et al. |
| 2010/0208802 | A1 | 8/2010 | Tsukuba et al. |
| 2010/0238355 | A1 | 9/2010 | Blume |
| 2010/0311437 | A1 | 12/2010 | Palanki et al. |
| 2011/0176615 | A1 | 7/2011 | Lee et al. |
| 2011/0243227 | A1 | 10/2011 | Yoneji et al. |
| 2011/0274162 | A1* | 11/2011 | Zhou et al. ............. 375/240.03 |
| 2012/0057566 | A1 | 3/2012 | Ahmadi |
| 2012/0106622 | A1* | 5/2012 | Huang ................ H04N 19/129 375/240.01 |
| 2016/0165250 | A1 | 6/2016 | Zhao et al. |

FOREIGN PATENT DOCUMENTS

| | | | | |
|---|---|---|---|---|
| CN | 102025986 | A | 4/2011 | |
| KR | WO 2011004986 | A2 * | 1/2011 | ........... H04N 19/176 |
| RU | 2404537 | C2 | 11/2010 | |
| RU | 2407214 | C2 | 12/2010 | |
| WO | 2006114759 | A2 | 11/2006 | |
| WO | 2010039731 | A2 | 4/2010 | |
| WO | WO2010102935 | A1 | 9/2010 | |
| WO | 2011075071 | A1 | 6/2011 | |

OTHER PUBLICATIONS

Seregin, et al., "Intra mode parsing without access neighbouring information," Joint Collaborative Team on Video Coding (JCT-VC) of ITU-T SG16 WP3 and ISO/IEC JTC1/SC29/WG11 JCTVC-F378, http://phenix.it-sudparis.eu/jct/doc_end_user/documents/6_Torino/wg11/JCTVC-F378-v6.zip, Jul. 18, 2011, 16 pp.

Office Action form counterpart Japanese Application No. 2014-521717, dated Jan. 20, 2015, 10 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chuang, et al.,"Luma Intra Prediction Mode Coding", JCT-VC Meeting; MPEG Meeting; Jul. 14, 2011-Jul. 22, 2011; Torino; (Joint Collaborative Team on Video Coding of ISO/ IEC JTC1/SC29/WG11 and ITU-T SG. 16 ); URL: http://wftp3.itu.int/av-arch/jctvc-site/, No. JCTVC-F062, 5 pp.

Ding et al., "Improved Intra Mode Coding by Multiple Mode Candidates" JCT-VC Meeting; MPEG Meeting; Jan. 20, 2011-Jan. 28, 2011; Daegu;(Joint Collaborative Team on Video Coding of ISO/IEC JTC1/SC29/WG11AND ITU-T SG.16 ); URL: http://wftp3.itu.int/av-arch/jctvc-site/, No. JCTVC-D253, XP030008293, 5 pp.

Guo, et al., "CE14 Subtest 1: Intra Most Probable Mode Coding for Luma", Mar. 9, 2011 No. JCTVC-E088, Mar. 9, 2011, XP030008594, ISSN: 0000-0007 Section 2 "Algorithm description"; Section 4 "Conclusion", 3 pp.

International Search Report and Written Opinion—PCT/US2012/047073—ISA/EPO—Feb. 7, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Karczewicz et al., "Analysis and Simplification of Intra Prediction" JVT Meeting; MPEG Meeting; Jul. 22, 2002-Jul. 26, 2002; Klagenfurt, AT; (Joint Video Team of ISO/IEC JTC1/SC29/WG11 and ITU-T SG.16), No. JVT-D025, XP030005299, ISSN: 0000-0441, 8 pp.

Ohm, "Digitale Bildcodierung. Section 18.2.1: Codierung des ortlichen Bewegungsvektorfeldes" In: "Digitale Bildcodierung. Section 18.2.1: Codierung des ortlichen Bewegungsvektorfeldes", Jan. 1, 1995 (Jan. 1, 1995), Springer-Verlag, Berlin Heidelberg New York, XP055090350, ISBN: 978-3-54-058579-4, 6 pp.

Van Wallendael, et al., "Improved Intra Mode Signaling for HEVC," IEEE International Conference on Multimedia and Expo (ICME), Jul. 11, 2011, XP031964819, DOI: 10.1109/ICME.2011.6012143, ISBN: 978-1-61284-348-3, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Xue, et al., "An Automatic Mode Decision Method for Intra Frame Coding and Decoding ", MPEG Meeting; Dec. 3, 2001-Dec. 7, 2001; Pattaya; (Motion Pictureexpert Group or ISO/IECJTC1/SC29/WG11), No. M7719, XP030036810, ISSN 0000-0279, 10 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Response to Written Opinion dated Feb. 7, 2013, from International Application No. PCT/US2012/047073, filed on May 16, 2013, 15 pp.

Second Written Opinion dated Dec. 11, 2013, from International Application No. PCT/US2012/047073, 10 pp.

Response to Second Written Opinion dated Dec. 11, 2013 from International Application No. PCT/US2012/047073, filed on Jan. 10, 2014, 31 pp.

(56) References Cited

OTHER PUBLICATIONS

International Preliminary Report on Patentability from International Application No. PCT/US2012/047073, dated Feb. 6, 2014, 12 pp.
Notice of Ground for Rejection from counterpart Korean Application No. 2014-7004481, dated Sep. 23, 2014, 6 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
Decision for Grant of Patent, and translation thereof, from counterpart Korean Application No. 2014-7004481, dated Feb. 17, 2015, 3 pp.
Office Action and Search Report, and translation thereof, from counterpart Taiwan Patent Application No. 101126095, dated Jan. 25, 2015, 13 pp.
Notification (Request) About Additional Materials, and translation thereof, from Ukranian Application No. a201401650, dated Feb. 26, 2015, 3 pp.
Chuang, et al., "Reducing Line Buffers for Motion Data and CABAC", JCT-VC Meeting; MPEG Meeting; Jul. 14-22, 2011; Torino;No. JCTVC-F060, XP030009083, 7 pp.
Sasai, et al., "Modified Context Derivation for Complexity reduction", JCT-VC Meeting; MPEG Meeting; Jul. 14-22, 2011; Torino; No. JCTVC-F429, XP030009452, 22 pp.
Office Action from counterpart Canadian Application No. 2,842,037, dated May 29, 2015, 4 pp.
Response to counterpart Canadian Office Action dated May 29, 2015, from Canadian Application No. 2,842,037, filed on Jun. 16, 2015, 16 pp.
Response to European Communication dated Feb. 27, 2014, from counterpart European Application No. 12745595.4, filed on Jul. 23, 2014, 2 pp.
European Examination Report from counterpart European Application No. 12745595.4, dated Jun. 24, 2015, 8 pp.
Examination Report from corresponding Canadian Application Serial No. 2,842,037 dated Sep. 25, 2015 (3 pages).
Response to Australian Examiner Report for corresponding Australian Patent Application No. 2012284123 filed Dec. 11, 2015 (29 pages).
Budagavi, et al., "Delta QP signaling at sub- LCU level", JCT-VC Meeting; MPEG Meeting; Jan. 20, 2011 - Jan. 28, 2011; Daegu; (Joint Collaborative Team on Video Coding of ISO/IEC JTC1/SC29/WG11AND ITU-TSG.16 ); URL: HTTP//WFTP3.ITU.INT/AV-ARCH/JCTVC-SITE/, No. JCTVC-D038, Jan. 15, 2011, ISSN: 0000-0015, 5 pp.
Panusopone, et al, "JCT-VC AHG Report: Coding Block Structures", Joint Collaborative Team on Video Coding (JCT-VC), 20110314, No. JCTVC-E007, Mar. 14, 2011, ISSN: 0000-0007, 2 pp.

* cited by examiner

BUFFERING PREDICTION DATA IN VIDEO CODING

This application claims priority to U.S. Provisional Application No. 61/509,933 filed 20 Jul. 2011 and U.S. Provisional Application No. 61/522,136, filed 10 Aug. 2011, the contents of each of which are hereby incorporated by reference in their entirety.

TECHNICAL FIELD

This disclosure relates to video coding, and, more specifically, to entropy coding of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data. For example, the techniques of this disclosure include reducing an amount of data that is buffered when performing prediction techniques in video coding. That is, spatial prediction (i.e., intra-prediction) or temporal prediction (i.e., inter-prediction) may be used to reduce or remove redundancy in video sequence. In block-based video coding, video data from one block may be used as prediction information for one or more other blocks of video data. Prediction information associated with one or more neighboring blocks of a block currently being coded may be stored (i.e., buffered), so that such prediction information is available for coding the current block. The techniques of this disclosure relate to limiting the amount of prediction information from neighboring blocks that is buffered during coding. According to some aspects of this disclosure, a video coding device may avoid using prediction information from blocks of video data that are positioned above a block of video data that is currently being coded (e.g., referred to as "above-neighboring blocks") when coding the current block.

In an example, aspects of this disclosure relate to a method of coding video data that includes determining prediction information for a block of video data, wherein the block is included in a coded unit of video data and positioned below a top row of above-neighboring blocks in the coded unit, and wherein the prediction information for the block is based on prediction information from one or more other blocks in the coded unit but not based on prediction information from any of the top row of blocks in the coded unit; and coding the block based on the determined prediction information.

In another example, aspects of this disclosure relate to an apparatus for coding video data. In this example, the apparatus includes one or more processors configured to determine prediction information for a block of video data, wherein the block is included in a coded unit of video data and positioned below a top row of above-neighboring blocks in the coded unit, and wherein the prediction information for the block is based on prediction information from one or more other blocks in the coded unit but not based on prediction information from any of the top row of blocks in the coded unit; and code the block based on the determined prediction information.

In another example, aspects of this disclosure relate to a non-transitory computer-readable storage medium having instructions stored thereon that, when executed, cause one or more processors to determine prediction information for a block of video data, wherein the block is included in a coded unit of video data and positioned below a top row of above-neighboring blocks in the coded unit, and wherein the prediction information for the block is based on prediction information from one or more other blocks in the coded unit but not based on prediction information from any of the top row of blocks in the coded unit; and code the block based on the determined prediction information.

In another example, aspects of this disclosure relate to an apparatus for coding video data. In this example, the apparatus includes means for determining prediction information for a block of video data, wherein the block is included in a coded unit of video data and positioned below a top row of above-neighboring blocks in the coded unit, and wherein the prediction information for the block is based on prediction information from one or more other blocks in the coded unit but not based on prediction information from any of the top row of blocks in the coded unit; and means for coding the block based on the determined prediction information.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
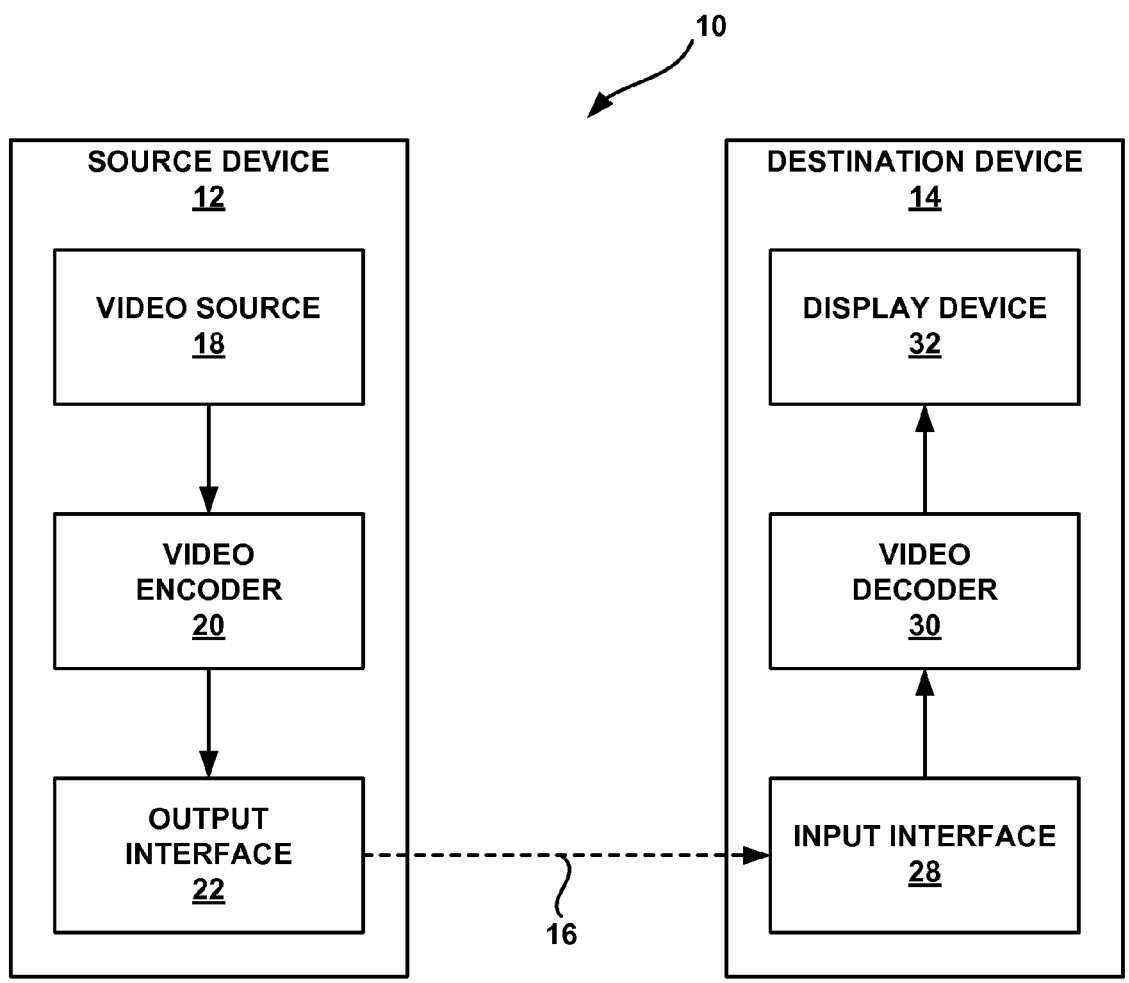
FIG. 1 is a block diagram illustrating an example video encoding and decoding system that may utilize the techniques described in this disclosure.

A video coding device may attempt to compress video data by taking advantage of spatial and/or temporal redundancy. For example, a video encoder may take advantage of spatial redundancy by coding a block relative to neighboring, previously coded blocks. Likewise, a video encoder may take advantage of temporal redundancy by coding a block relative to data of previously coded pictures. In particular, the video encoder may predict a current block from data of a spatial neighbor or from data of a previously coded picture. The video encoder may then calculate a residual for the block as a difference between the actual pixel values for the block and the predicted pixel values for the block. Accordingly, the residual for a block may include pixel-by-pixel difference values in the pixel (or spatial) domain.

With respect to intra-coding, a video encoder may generate a predictive block according to a predefined intra-prediction mode. The video encoder may subtract the values of the predictive block from the values of the block currently being encoded to produce a block of residual data. The video encoder may signal the intra-prediction mode and the block of the residual data in an encoded bitstream that may be decoded by a video decoder. The decoder can generate the same predictive block (e.g., using the same intra-prediction mode) and reconstruct the encoded video block by combining the residual data with the data of the predictive block.

The emerging HEVC standard may use as many as thirty-five or more intra-prediction modes. In order to reduce the number of bits needed to signal the intra-prediction mode selected by the video encoder, the video encoder may identify intra-prediction modes for already coded video blocks, such as one or more spatially neighboring blocks. Based on the intra-prediction modes of these neighboring blocks, the video encoder can identify a most probable intra-prediction mode for the current video block. The most probable intra-prediction mode represents the intra-prediction mode that is most likely to be used for encoding a current video block based on a context for the current block. The context may, for example, be defined by some combination of the intra-prediction modes used for neighboring blocks, a size of the current block, and other factors. The factors used by the video encoder to determine the context for the current video block are also discernible by the video decoder. Thus, the most probable intra-prediction mode determined by the video encoder can also be determined by a video decoder without having to be explicitly signaled to the video decoder. The most probable intra-prediction mode may or may not be the same as the intra-prediction mode actually used to encode the current block. The actual intra-prediction mode can be determined by a video encoder based on which intra-prediction mode produces the best quality of reconstructed video.

A video encoder can generate a syntax element for inclusion in the bitstream indicating if the most probable intra-prediction mode is the same as the actual prediction mode for the current video block. The syntax element may, for example, be a single bit, where "1" indicates that the actual intra-prediction mode is the most probable intra-prediction mode and "0" indicates that the actual intra-prediction mode is not the most probable intra-prediction mode. Thus, when the actual intra-prediction mode for a current video block is the most probable intra-prediction mode, the actual intra-prediction mode for the current video block can be signaled from encoder to decoder using a single bit (a "1" in this example). In instances where the actual intra-prediction mode is not the most probable intra-prediction mode, the actual intra-prediction can be signaled with a codeword following the first bit (i.e. a first bit of "0" followed by a codeword).

With respect to inter-coding, a video encoder may generate a motion vector to identify a predictive block of video data, e.g., from another video picture or slice, which may be used to predict the values of a block currently being encoded. The video encoder may subtract the values of the predictive block from the values of the current block to produce a block of residual data. In general, the video encoder may signal the motion vector and residual data in an encoded bitstream that may be decoded by a video decoder. The decoder can locate the same predictive block (e.g., based on the motion vector) among a set of decoded blocks in a decoded picture buffer, and reconstruct the encoded video block by combining the residual data with the data of the predictive block.

In some cases, predictive coding of motion vectors is also applied to further reduce the amount of data needed to communicate the motion vector. In this case, rather than encoding and communicating the motion vector itself, the encoder encodes and communicates a motion vector difference (MVD) relative to a known (or knowable) motion vector. The known motion vector, which may be used with the MVD to define the current motion vector, can be defined by a so-called motion vector predictor (MVP).

A process referred to in the upcoming HEVC standard as adaptive motion vector prediction (AMVP) may be implemented in which a motion vector candidate set is built from several neighboring blocks in spatial and temporal directions. The motion vector candidate set includes a plurality of candidates for MVP. In this case, the video encoder selects the most accurate predictor from the candidate set based on analysis of encoding rate and distortion (e.g., using so-called rate-distortion cost analysis). A motion vector predictor index (mvp_idx) may be transmitted to the video decoder to inform the decoder where to locate the MVP, i.e., which of the MVP candidates is to be used for decoding. The MVD is also communicated. The decoder can combine the MVD with the MVP (defined by the motion vector predictor index) so as to reconstruct the motion vector.

A so-called "merge mode" may also be available, in which motion information (e.g., motion vectors, reference prediction indexes, prediction directions, or other information) of a neighboring video block is inherited for a current video block being coded. An index value may be used to identify the neighbor from which the current video block inherits its motion information (e.g., top, top right, left, or co-located from a temporally adjacent frame). The merge mode uses motion information from one of several candidate blocks, but does not rely on an MVD.

Accordingly, this disclosure generally refers to "prediction information" as intra-prediction information and/or inter-prediction information for generating a predictive block of video data. That is, with respect to intra-coding, prediction information may refer to an intra-coding mode used to a code a block of video data. Prediction information may also refer to intra-coding modes of neighboring blocks, in examples in which such neighboring intra-coding modes are used for coding the block (e.g., using the most probable mode derivation process described above). Additionally or alternatively, for inter-prediction, prediction information may refer to motion information (e.g., motion vectors, reference picture indexes, prediction directions, or other information) used to code a block of video data. Prediction information may also refer to motion information of neighboring blocks, in examples in which such neighboring motion information is used for coding the block (e.g., using the AMVP and merge mode processes described above).

In any case, prediction information may be stored to a so-called "line buffer," so that the prediction information is available for reference during coding. With respect to intra-coding, the video coder may store an intra-prediction mode for each of the blocks. With respect to inter-coding, the video coder may store motion information (e.g., motion vectors (mvx, mvy), reference picture indexes (ref_idx), prediction directions (inter_dir), or other information) for each of the blocks. The line buffer may store prediction information associated with a line of blocks positioned above a block or slice currently being coded and typically extends across the entire width of the picture.

The line buffer may include memory that may be accessed by the video coder. The line buffer may strike a balance between buffering prediction information for an entire frame, which may be a relatively large amount of data, and buffering prediction information that has the highest potential to be accessed during coding. That is, in some examples, only the most frequently used prediction information may be stored to the line buffer in order to keep the size of the buffer as small as possible.

However, as video resolution and the width of frames (e.g., the number of pixels from right to left across a given video frame) increase, the amount of data that is stored in the line buffer also increases. In some examples, blocks of video data as small as 4×4 pixels may be used to code a picture. As an example, a 1920×1080 pixel picture (e.g., for 1080 p video) may include as many as 495 blocks of 4×4 pixels. Accordingly, if prediction information is stored for each block of video data, a video coder may be required to store a relatively substantial amount of data to the line buffer.

The techniques of this disclosure generally relate to limiting or reducing the amount of prediction information from neighboring blocks that is buffered during coding. For example, rather than using prediction information of above-neighboring blocks when coding a current block, in some examples, a video coding device may determine prediction information based on prediction information from left-neighboring blocks. In other examples, a video coding device may determine prediction information based on data from an above-neighboring block, but only when the current block is a sub-block of a larger partition (e.g., referred to in the emerging High Efficiency Video Coding (HEVC) standard as a largest coding unit (LCU), as described in greater detail below), and such a sub-block does not border another LCU. A variety of other techniques, as described below, may also be used to reduce the amount of predictive information that is buffered during video coding.

Limiting the amount of data that is buffered, according to the techniques of this disclosure, may reduce the complexity associated with coding video data. For example, aspects of this disclosure may allow a video coding device to buffer less data, thereby reducing the memory requirements associated with such buffering. In addition, reducing the locations from which prediction information is derived may improve entropy coding efficiency and/or throughput. For example, the techniques of this disclosure may be implemented to improve parsing throughput. That is, as video data is received by a video coder, the video data may be parsed (e.g., read and segmented) according to a particular parsing process (e.g., wavefront parsing). In some examples, the parsing process may include parsing each LCU of a slice after parsing one or more initial LCUs (e.g., an upper and/or left most LCU in a slice). Parsing the LCUs may allow for the video coder to form multiple processing threads (e.g., for parallel processing), with each thread including one or more of the parsed LCUs.

Due to prediction information dependencies, however, certain threads may be dependent on other threads, which may not be optimal for parallel processing applications. For example, a first thread may depend on data processed by a second, different thread, which may cause the first thread to wait until the second thread has processed the data. That is, data is generally parsed up to the point that the data is useful, and then the data is coded. In the case of conventional wavefronts, a video coder may slow to code data of a first (e.g., top) wavefront. That, in turn, may cause the next thread to stop, which causes the next thread to stop, and so on. By eliminating prediction information dependencies, according to the aspects of this disclosure, one thread slowing down will not impact other threads being processed. With respect to parsing, this means that the parser for the thread does not need to reference other threads, but may operate independently for each thread.

In one example, for purposes of illustration, assume that an LCU currently being coded is positioned below a top row of a slice, with one or more LCUs of the slice positioned above the current slice. In this example, prediction information for coding the current LCU may be included in an upper neighboring LCU (e.g., an LCU positioned above the current LCU). That is, prediction information for coding the current LCU may depend on one or more values (e.g., intra-prediction modes, motion information, or the like) of the upper neighboring LCU. Accordingly, the current LCU may have to wait for the upper neighboring LCU to be coded before the current LCU can be coded. Introducing such latency may slow the coding process, particularly in parallel processing applications. Aspects of this disclosure may be implemented to reduce such dependencies, thereby reducing the potential for the above described latencies.

FIG. 1 is a block diagram illustrating an example video encoding and decoding system 10 that may utilize techniques for efficient storage of prediction information. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a recording medium at the time of encoding, which then may be retrieved by a decoding device at any time after being stored to this medium.

The techniques of this disclosure, which generally relate to efficient storage of prediction data, are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding motion vectors and for performing bi-prediction in HEVC and its extensions, such as multiview or three-dimensional video (3DV) extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for efficient storage of prediction data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. In particular, this disclosure refers to a "coded unit" as a unit of data including multiple blocks, such as a slice, picture, set of wavefronts, or tile. Thus, the term "coded unit" should be understood to include multiple blocks, e.g., multiple largest coding units (LCUs). Moreover, the term "coded unit" should not be confused with the terms "coding unit" or CU as used in HEVC. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). The latest Working Draft (WD) of HEVC, and referred to as HEVC WD7 hereinafter, is available from http://phenix.int-evry.fr/jct/doc_end_user/documents/9_Geneva/wg11/JCTVC-I1003-v5.zip, with a more recent version available from http://phenix.int-evey.fr/jct/doc_end_user/documents/9_Geneva/wg11/JCTVC-I1003-v6.zip, both of which are hereby incorporated by reference as if set forth in their entirety herein. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs.

Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC). Moreover, this disclosure may use the term "coded unit" to describe a predefined quantity of video data, which may include two or more blocks of video data. That is, for example, a coded unit may refer to a picture, a slice, a tile or set of tiles, a set of wavefronts, or any other predefined unit that includes video data. Accordingly, the term "coded unit" should not be confused with the terms "coding unit" or CU.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

In general, the video decoding process performed by video decoder 30 may include reciprocal techniques to the encoding techniques performed by video encoder 20. Although generally reciprocal, video decoder 30 may, in some instances, perform techniques similar to those performed by video encoder 20. Video decoder 30 may also rely on syntax elements or other data contained in a received bitstream that includes the data described with respect to video encoder 20.

According to aspects of this disclosure, video encoder 20 and/or video decoder 30 may implement the techniques of this disclosure for limiting the amount of data from neighboring blocks that is buffered during coding, e.g., in a line buffer. For example, video encoder 20 and/or video decoder 30 may limit the amount of prediction information from neighboring blocks that is buffered during coding. As noted above, prediction information may include intra-prediction information (e.g., an intra-coding mode) or motion information (e.g., motion vectors, reference picture indexes, prediction directions, or other information). According to aspects of this disclosure, rather than using prediction information of above-neighboring blocks when coding a current block, in some examples, video encoder 20 and/or video decoder 30 may determine prediction information based on prediction information from left-neighboring blocks. In other examples, video encoder 20 and/or video decoder 30 may determine prediction information based on data from an above-neighboring block, but only when the current block is a sub-block of a larger partition (e.g., referred to in the emerging High Efficiency Video Coding (HEVC) standard as a largest coding unit (LCU), as described in greater detail below), and such a sub-block does not border another LCU. A variety of other techniques, as described below, may also be used to reduce the amount of predictive information that is buffered by video encoder 20 and/or video decoder 30 during video coding.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Figure 2:
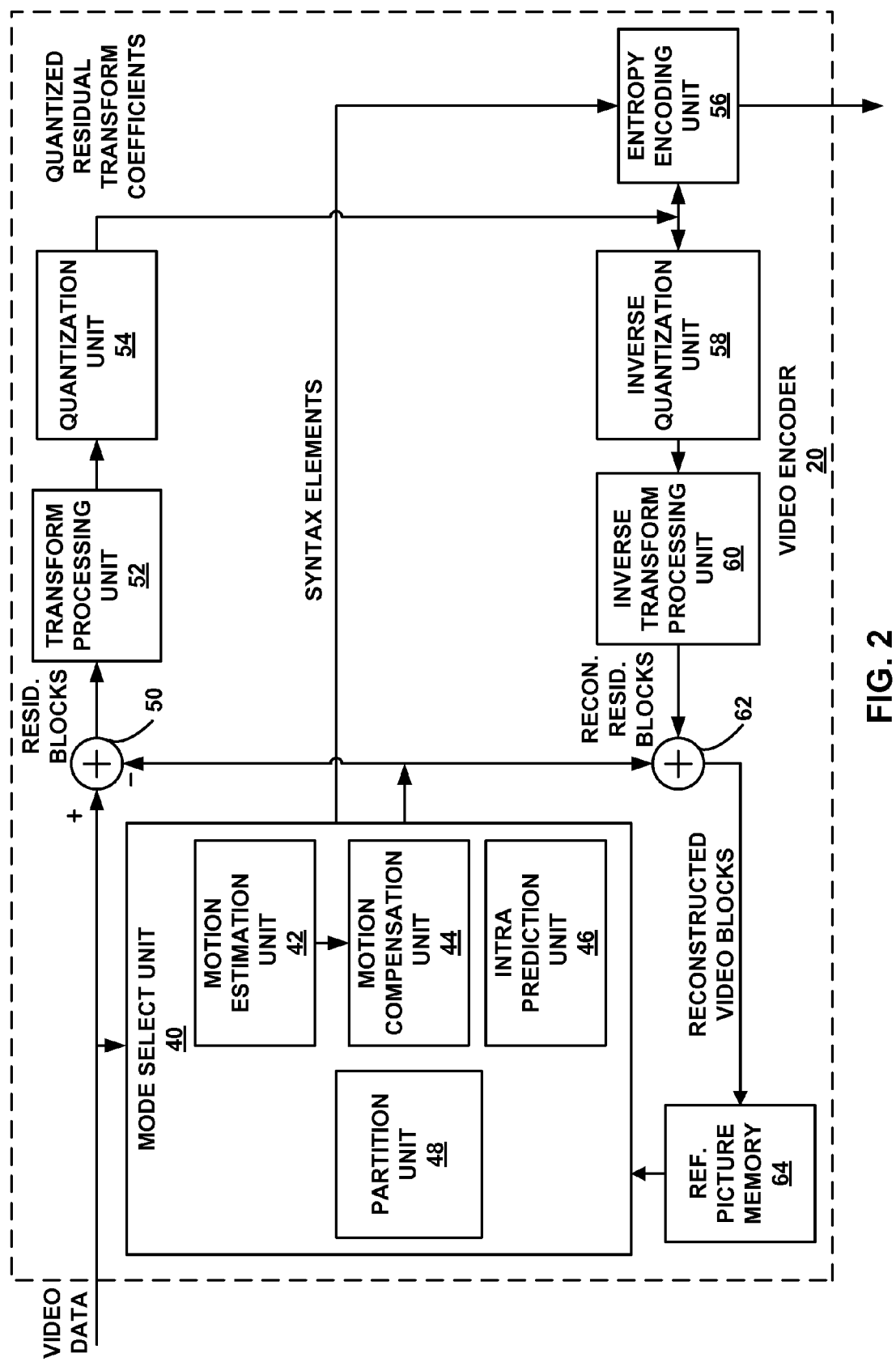
FIG. 2 is a block diagram illustrating an example video encoder that may implement the techniques described in this disclosure.

FIG. 2 is a block diagram illustrating an example video encoder 20 that may implement the techniques described in this disclosure for efficient storage of prediction information. Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives video data to be encoded. In the example of FIG. 2, video encoder 20 includes a mode select unit 40, summer 50, transform processing unit 52, quantization unit 54, entropy encoding unit 56, and reference picture memory 64. Mode select unit 40, in turn, includes motion estimation unit 42, motion compensation unit 44, intra prediction unit 46, and partition unit 48. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). As noted above, motion vectors may constitute prediction information.

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

In some examples, rather than sending the actual motion vector for a current PU, motion estimation unit 42 may predict the motion vector to further reduce the amount of data needed to communicate the motion vector. In this case, rather than encoding and communicating the motion vector itself, motion estimation unit 42 may generate a motion vector difference (MVD) relative to a known (or knowable) motion vector. The known motion vector, which may be used with the MVD to define the current motion vector, can be defined by a so-called motion vector predictor (MVP). In general, to be a valid MVP, the motion vector being used for prediction must point to the same reference picture as the motion vector currently being coded.

In some examples, motion estimation unit 42 may build a motion vector predictor candidate list that includes several neighboring blocks in spatial and/or temporal directions as candidates for MVP. When multiple motion vector predictor candidates are available (from multiple candidate blocks), motion estimation unit 42 may determine a motion vector predictor for a current block according to predetermined selection criteria. For example, motion estimation unit 42 may select the most accurate predictor from the candidate set based on analysis of encoding rate and distortion (e.g., using a rate-distortion cost analysis or other coding efficiency analysis). In other examples, motion estimation unit 42 may generate an average of the motion vector predictor candidates. Other methods of selecting a motion vector predictor are also possible.

Upon selecting a motion vector predictor, motion estimation unit 42 may determine a motion vector predictor index (mvp_flag), which may be used to inform a video decoder (e.g., such as video decoder 30) where to locate the MVP in a reference picture list containing MVP candidate blocks. Motion estimation unit 42 may also determine the MVD between the current block and the selected MVP. The MVP index and MVD may be used to reconstruct the motion vector.

In some examples, motion estimation unit 42 may instead implement a so-called "merge mode," in which motion estimation unit 42 may "merge" motion information (such as motion vectors, reference picture indexes, prediction directions, or other information) of predictive video block with a current video block. Accordingly, with respect to merge mode, a current video block inherits the motion information from another known (or knowable) video block. Motion estimation unit 42 may build a merge mode candidate list that includes several neighboring blocks in spatial and/or temporal directions as candidates for merge mode. Motion estimation unit 42 may determine an index value (e.g., merge_idx), which may be used to inform a video decoder (e.g., such as video decoder 30) where to locate the merging video block, i.e., the block from which motion information is obtained, in a reference picture list containing merging candidate blocks.

According to aspects of this disclosure, motion estimation unit 42 may limit the amount of motion information, e.g., motion vectors, reference picture indexes, prediction directions, or other information, from neighboring blocks that is buffered during encoding. For example, rather than determining an MVP or merge candidate for a current block based on motion information from above-neighboring blocks, motion estimation unit 42 may determine motion information for encoding the current block based on motion information from left-neighboring blocks. In other examples, motion estimation unit 42 may determine motion information for the current block based on data from an above-neighboring block, but only when the current block is a sub-block of an LCU and the above-neighboring block is from the same LCU. In still other examples, motion estimation unit 42 may implement other techniques (e.g., sub-sampling, interpolation, and the like, as described in greater detail below) to reduce the amount of motion information that is buffered during encoding.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In some examples, intra-prediction unit 46 may indicate a selected intra-prediction mode using a so-called most probable mode. For example, intra-prediction unit 46 may indicate the intra-prediction mode for a current block based on a context model that includes previously encoded blocks. In an example, intra-prediction unit 46 may determine a most probable mode based on previously encoded blocks that border the current block to the relative top and relative left, assuming a left-to-right, top-to-bottom encoding order for blocks. These blocks may have a high probability of having the same intra-mode as the current block.

In one example, if the blocks to the top and left of the current block are encoded with different modes, intra-prediction unit 46 may select the intra-mode having the lower numerical ranking as the most probable mode, according to a predefined ranking of intra-modes maintained by intra-prediction unit 46 (e.g., a numerical ranking of intra-modes according to mode numbers). In another example, if the blocks to the top and left of the current block are encoded with different modes, intra-prediction unit 46 may select a predefined default mode, such as DC intra-mode, as the most probable mode. The process of selecting a most probable mode when the context of a current block includes more than one intra-mode, however, is provided as examples only, and intra-prediction unit 46 may be configured to determine a most probable mode in a variety of other ways.

After determining the most probable intra-mode, intra-prediction unit 46 may set a flag (e.g., a most_probable_mode flag) based on a comparison of the most probable mode to the selected intra-mode used to encode a current block. For example, if the most probable mode is the same as the selected intra-mode for the current block, intra-prediction unit 46 may set the most probable mode flag to a value of 1, indicating that the selected intra-mode and most probable modes are the same. In this example, no additional bits are required to signal the selected mode. That is, upon receiving a most probable mode flag that has been set to 1, a video decoder (such as video decoder 30) may reproduce the same procedure for determining the most probable mode, e.g., as used by the encoder, and then use the most probable mode to decode the received block.

If the most probable mode is not the same as the selected intra-mode for the current block, intra-prediction unit 46 may set the most probable mode flag to a value of 0, indicating that the modes are not the same. In this example, additional bits may be required to signal the actual intra-mode used to encode the current block, either directly or by an index to another one of the neighboring blocks. According to some examples, intra-prediction unit 46 may maintain a numerical ranking of the intra-modes, with the most often used intra-modes having the lowest numerical ranking. In such examples, intra-prediction unit 46 may signal the actual intra-mode used to encode the current block based on the numerical ranking or another numerical identifier.

According to aspects of this disclosure, intra-prediction unit 46 may limit the amount of prediction information, e.g., intra-mode data, from neighboring blocks that is buffered during encoding. For example, rather than determining a most probable intra-mode for a current block based on intra-mode data from above-neighboring blocks, intra-prediction unit 46 may determine a most probable intra-mode for encoding the current block based on intra-modes of left-neighboring blocks. That is, for example, intra-prediction unit 46 may determine a most probable intra-mode for decoding the current block only based on intra-modes of left-neighboring blocks, without determining intra-modes from above-neighboring blocks. In other examples, intra-prediction unit 46 may determine a most probable intra-mode for the current block based on data from one or more left-neighboring blocks and an above-neighboring block, but only when the current block is a sub-block of an LCU, and the above-neighboring block is from the same LCU. In still other examples, intra-prediction unit 46 may implement other techniques (e.g., sub-sampling, interpolation, and the like, as described in greater detail below) to reduce the amount of intra-mode data that is buffered during encoding.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks.

With respect to CABAC, entropy encoding unit 56 may select a context model that operates on context to encode symbols associated with a block of video data. For example, entropy encoding unit 56 may entropy encode each syntax element for a block of video data using probability estimates for each syntax element. The probability estimates may indicate a likelihood of an element having a given value. The probability estimates may be included within a probability model, also referred to as a context model. Entropy encoding unit 56 may select a context model by determining context information (or, more simply, "context") for the syntax element. A different probability model is defined for each context. After coding the syntax element, entropy encoding unit 56 may update the selected context model based on an actual value of the syntax element to reflect the most current probability estimates. That is, for example, entropy encoding unit 56 may update the manner in which a context model is selected to transition to a new context model.

Following the entropy coding by entropy encoding unit 56, the encoded bitstream may be transmitted to another device (e.g., video decoder 30) or archived, e.g., to a recording medium, for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

In this manner, video encoder 20 is an example of a video coder that may perform a method including determining prediction information for a first block of video data, wherein the first block is included within a coded unit of video data, where the first block is below a top row of blocks in the coded unit, determining prediction information for a second block of video data below the top row of blocks in the coded unit based on the prediction information for the first block of video data and without being based on prediction information from the top row of blocks in the coded unit, and coding the second block based on the determined prediction information for the second block.

Figure 3:
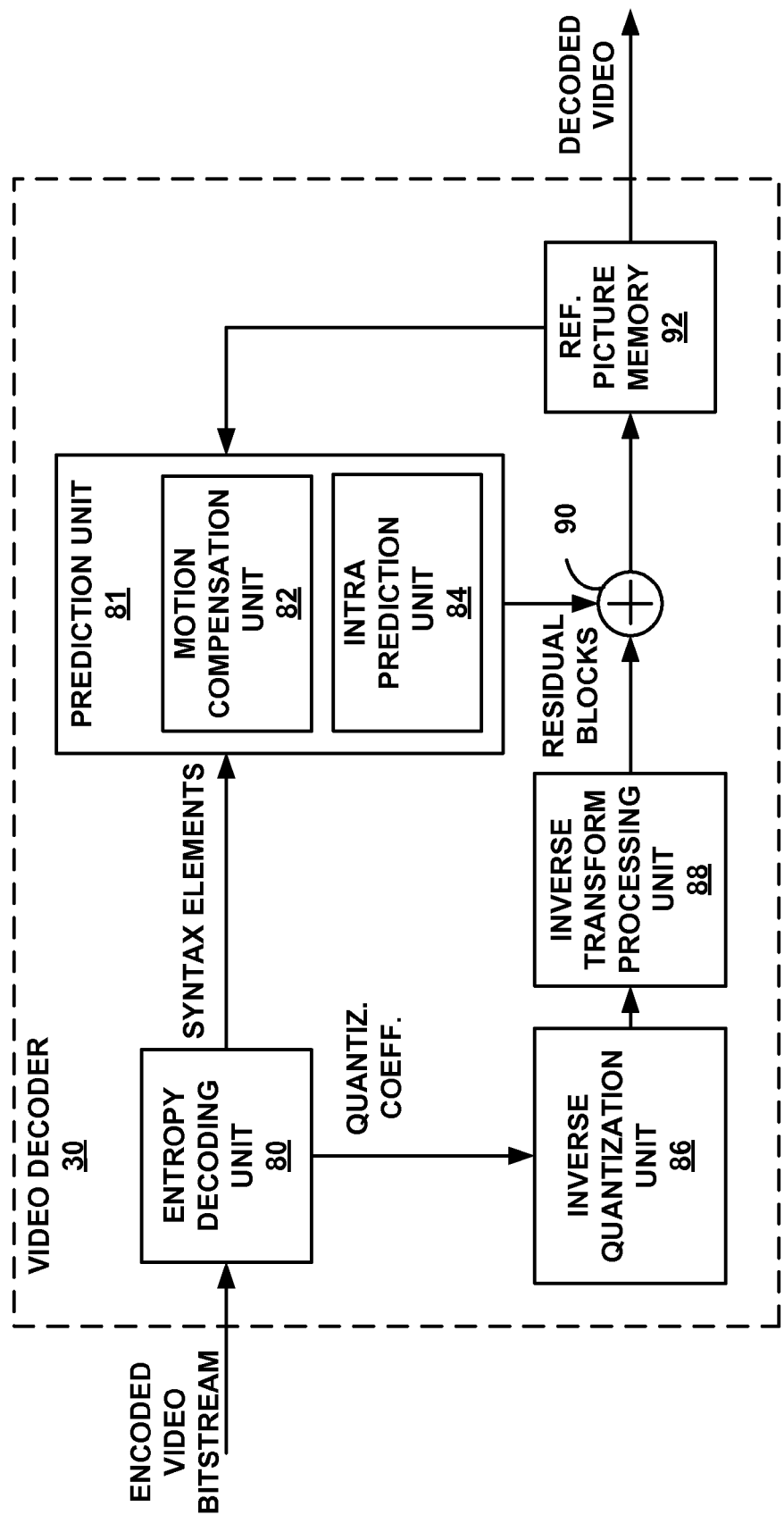
FIG. 3 is a block diagram illustrating an example video decoder that may implement the techniques described in this disclosure.

FIG. 3 is a block diagram illustrating an example video decoder 30 that may implement the techniques described in this disclosure for entropy coding video data. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements.

Video decoder 30 may receive the syntax elements at the video slice level and/or the video block level. For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

Entropy decoding unit 80 may be configured similarly to entropy encoding unit 56, as described above with respect to video encoder 20 of FIG. 2. For example, entropy coding unit 80 may select a context model that operates on context to decode symbols associated with a block of video data. That is, entropy coding unit 80 may entropy decode each syntax element for a block of video data using probability estimates for each syntax element.

Entropy decoding unit 80 forwards the motion vectors and other decoded syntax elements to prediction unit 81. When the video slice is coded as an intra-coded (I) slice, intra prediction unit 84 of prediction unit 81 may generate prediction data for a video block of the current video slice based on a signaled intra prediction mode (e.g., signaled as the most probable mode, directly, or by an index to another one of the neighboring blocks) and data from previously decoded blocks of the current picture. When the video picture is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

According to aspects of this disclosure, motion compensation unit 82 may limit the amount of motion information, e.g., motion vectors, reference picture indexes, prediction directions, or other information, from neighboring blocks that is buffered during decoding. For example, rather than determining an MVP or merge candidate for a current block based on motion information from above-neighboring blocks, motion compensation unit 82 may determine motion information for decoding the current block based on motion information from left-neighboring blocks. In other examples, motion compensation unit 82 may determine motion information for the current block based on data from an above-neighboring block, but only when the current block is a sub-block of an LCU and the above-neighboring block is from the same LCU. In still other examples, motion compensation unit 82 may implement other techniques (e.g., sub-sampling, interpolation, and the like, as described in greater detail below) to reduce the amount of motion information that is buffered during decoding.

According to aspects of this disclosure, intra-prediction unit 84 may limit the amount of prediction information, e.g., intra-mode data, from neighboring blocks that is buffered during decoding. For example, rather than determining a most probable intra-mode for a current block based on intra-mode data from above-neighboring blocks, intra-prediction unit 84 may determine a most probable intra-mode for decoding the current block based on intra-modes of left-neighboring blocks. That is, for example, intra-prediction unit 84 may determine a most probable intra-mode for decoding the current block only based on intra-modes of left-neighboring blocks, without determining intra-modes from above-neighboring blocks. In other examples, intra-prediction unit 84 may determine a most probable intra-mode for the current block based on data from one or more left neighboring blocks and an above-neighboring block, but only when the current block is a sub-block of an LCU, and the above-neighboring block is from the same LCU. In still other examples, intra-prediction unit 84 may implement other techniques (e.g., sub-sampling, interpolation, and the like, as described in greater detail below) to reduce the amount of intra-mode data that is buffered during decoding.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform processing unit 88 may determine the manner in which transforms were applied to residual data. That is, for example, inverse transform processing unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 is an example of a video decoder that may perform a method including determining prediction information for a first block of video data, wherein the first block is included within a coded unit of video data, where the first block is below a top row of blocks in the coded unit, determining prediction information for a second block of video data below the top row of blocks in the coded unit based on the prediction information for the first block of video data and without being based on prediction information from the top row of blocks in the coded unit, and coding the second block based on the determined prediction information for the second block.

Figure 4A:
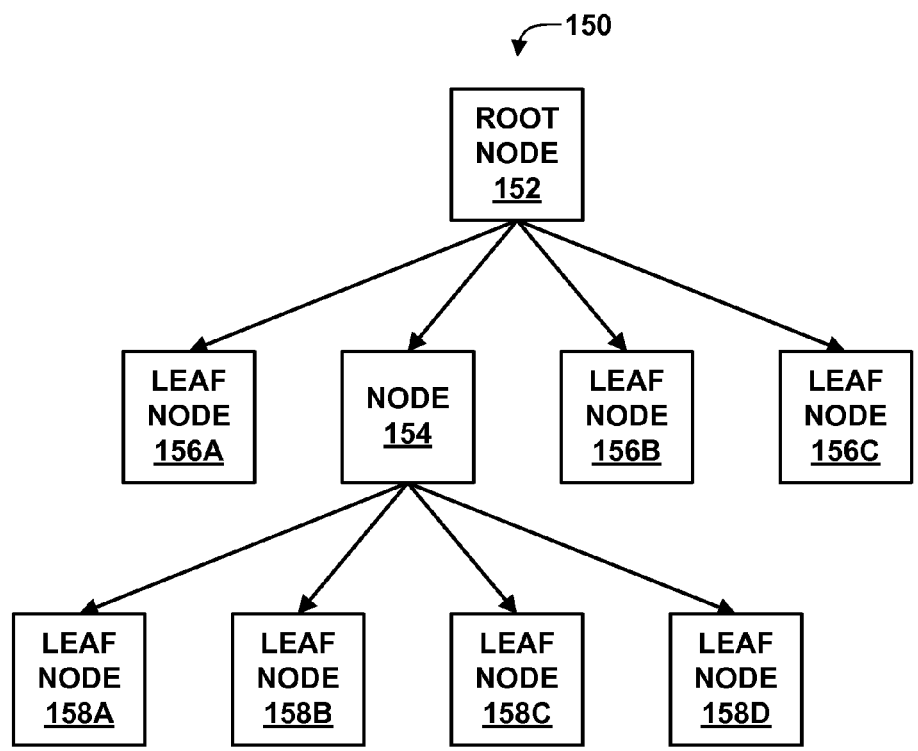
FIGS. 4A and 4B are conceptual diagrams illustrating an example quadtree and a corresponding largest coding unit (LCU).
Figure 4B:
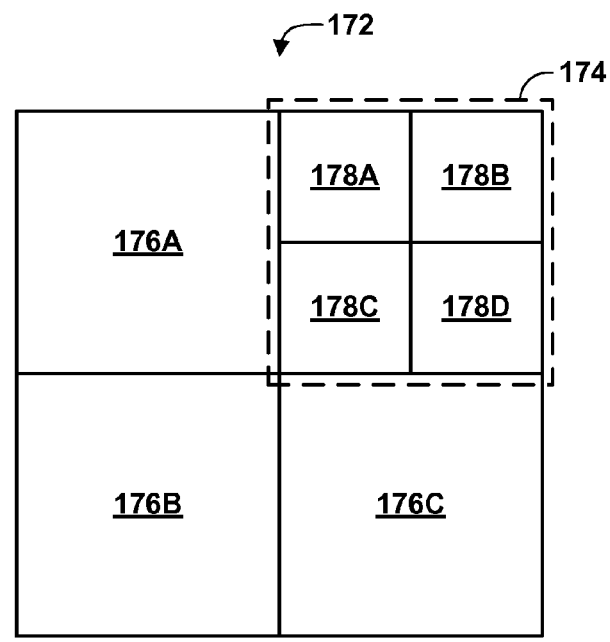

FIGS. 4A and 4B are conceptual diagrams illustrating an example quadtree 150 and a corresponding largest coding unit 172. FIG. 4A depicts an example quadtree 150, which includes nodes arranged in a hierarchical fashion. The quadtree 150 may be associated with, for example, a treeblock according to the proposed HEVC standard. Each node in a quadtree, such as quadtree 150, may be a leaf node with no children, or have four child nodes. In the example of FIG. 4A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding largest coding unit (LCU), such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split flag values may be 101000000.

As noted above, CU depth may refer to the extent to which an LCU, such as LCU 172 has been divided. For example, root node 152 may correspond to CU depth zero, while node 154 and leaf nodes 156 may correspond to CU depth one. In addition, leaf nodes 158 may correspond to CU depth two. According to aspects of this disclosure, CU and/or TU depth may be used as context for entropy coding certain syntax elements. In an example for purposes of explanation, one or more syntax elements associated with leaf node 156A may be entropy coded using a different context model than leaf node 158A, because leaf node 156A is located at depth one, while leaf node 158A is located at depth two.

While FIG. 4A illustrates an example of a CU quadtree, it should be understood that a similar quadtree may be applied to TUs of a leaf-node CU. That is, a leaf-node CU may include a TU quadtree (referred to as a residual quad tree (RQT)) that describes partitioning of TUs for the CU. A TU quadtree may generally resemble a CU quadtree, except that the TU quadtree may signal intra-prediction modes for TUs of the CU individually.

According to some aspects of this disclosure, a video coder (such as video encoder 20 and/or video decoder 30) may determine prediction information for a current block based on prediction information from certain neighboring CUs. For example, as described in greater detail below, the video coder may determine prediction information for sub-CU 178C based on neighboring CUs, such as sub-CU 176A. In some examples, the video coder may avoid determining prediction information based on certain neighboring CUs, such as above-neighboring sub-CU 178. However, according to aspects of this disclosure, as described in greater detail below, the video coder may determine prediction information using above-neighboring CUs, provided the information for the above-neighboring CUs does not require being stored to a line buffer.

For example, according to aspects of this disclosure, the video coder may determine prediction information for sub-CU 178C based on the above-neighboring sub-CU 178A, because the above-neighboring sub-CU 178A is located in the same LCU (i.e., LCU 172) as sub-CU 178C. In some examples, data associated with all CUs of an LCU is available (e.g., without external buffering) while coding the LCU. Accordingly, according to aspects of this disclosure, the video coder may use prediction information associated with the blocks an LCU without buffering the prediction information. That is, according to aspects of this disclosure, the video coder may determine prediction information for sub-CU 178C based on the above-neighboring sub-CU 178A without buffering the prediction information of sub-CU 178A in a line buffer.

Figure 5:
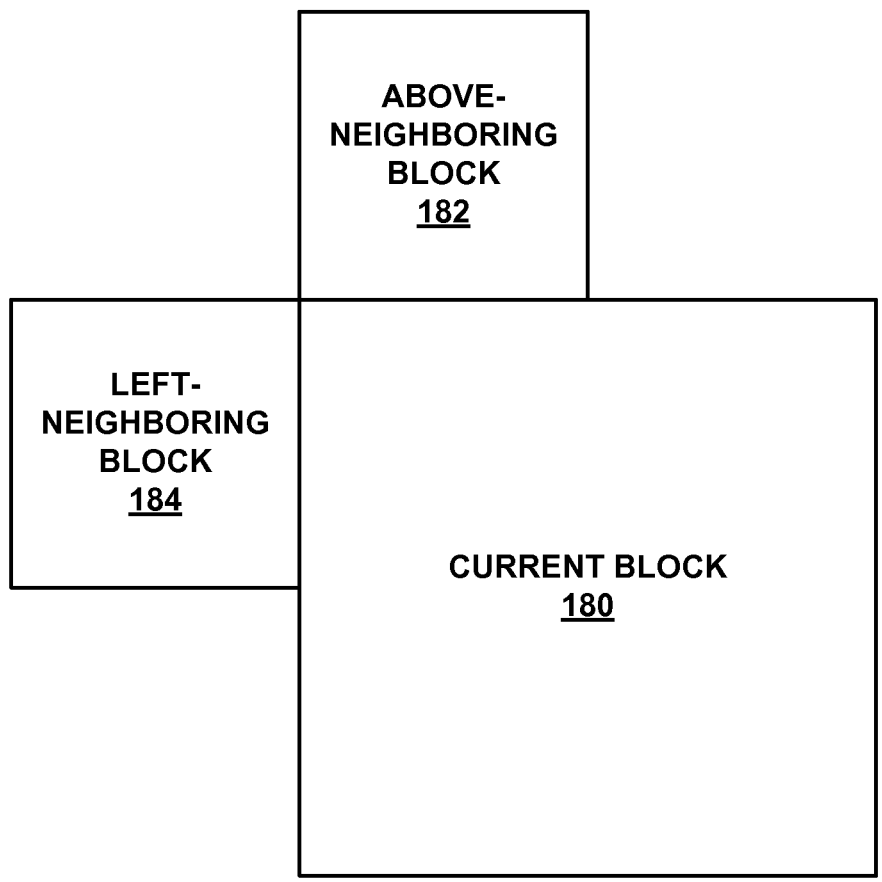
FIG. 5 is a diagram illustrating example neighboring blocks from which a most probable intra-mode may be determined.

FIG. 5 is a diagram illustrating example neighboring blocks from which a most probable intra-mode may be determined when intra-coding a block. For example, assume, for purposes of explanation, that a video decoder (such as video decoder 30) is currently decoding a syntax element indicating a particular prediction mode (e.g., an intra-prediction mode) of pixels within current block 180. In this example, video decoder 30 may identify the intra-prediction modes from above-neighboring block 182 and left-neighboring block 184 to determine context for the current syntax element. Accordingly, a context model used to entropy decode the current syntax element may depend on the intra-prediction modes of above-neighboring block 182 and left-neighboring block 184.

In this example, video decoder 30 may store, or buffer data indicating the intra-prediction modes of above-neighboring block 182 and left-neighboring block 184, so that such data is available when performing intra-prediction. For example, video decoder 30 may store the intra-prediction mode of above-neighboring block 182 in a line buffer that extends the width of a picture containing blocks 180-184, so that the intra-prediction mode is available to be used as context for coding current block 180.

However, as video resolution and the width of frames (e.g., the number of pixels from right to left across a given video frame) increase, the amount of data that is stored in the line buffer also increases. In some examples, as noted above, bocks of video data as small as 4×4 pixels may be used to code a picture. As an example, a 1920×1080 pixel picture (e.g., for 1080 p video) may include a width having as many as 495 blocks of 4×4 pixels. Each block may have an associated intra-prediction mode. With 35 potential intra-prediction modes, video decoder 30 may store up to six bits of intra-prediction information for each of the 495 blocks. Accordingly, if intra-prediction modes for each block of a picture are stored to a line buffer (which, in the example shown in FIG. 5 includes block 182) video decoder 30 may be required to store a relatively substantial amount of data to the line buffer.

The techniques of this disclosure generally relate to limiting the amount of intra-mode data from neighboring blocks that is buffered during coding. That is, aspects of this disclosure relate to limiting the amount of intra-mode data that is stored to a line buffer for use when performing a most probable mode derivation. As described in greater detail with respect to FIG. 7 and elsewhere in this disclosure, according to some aspects of this disclosure, a video coder (such as video encoder 20 or video decoder 30) may determine a most probable intra-mode for current block 180 based on left-neighboring block 184 (as well as one or more other left-neighboring blocks, as shown in the example of FIG. 8), but not based on above-neighboring block 182. In this example, the video coder may avoid storing the intra-mode of above-neighboring block 182 to a line buffer, because the intra-mode is not used to determine the most probable intra-mode for current block 180.

In other examples, the video coder may determine the intra-mode of current block 180 based on above-neighboring block 182, but only when above-neighboring block 182 is from the same LCU as current block 180. In such an example, the intra-mode for above-neighboring block 182 may be available (without being stored in a line buffer), because all information of an LCU is typically available during coding of the LCU. If above-neighboring block 182 is from a different LCU, however, the data associated with above-neighboring bock 182 may be included with the different LCU (e.g., in an encoded bitstream). Accordingly, in that example, the video coder may need to buffer the intra-mode, which requires memory resources and may also prevent parallel coding of LCUs, as described above. A variety of other techniques, as described below, may also be used to reduce the amount of predictive information that is buffered during video coding.

Figure 6:
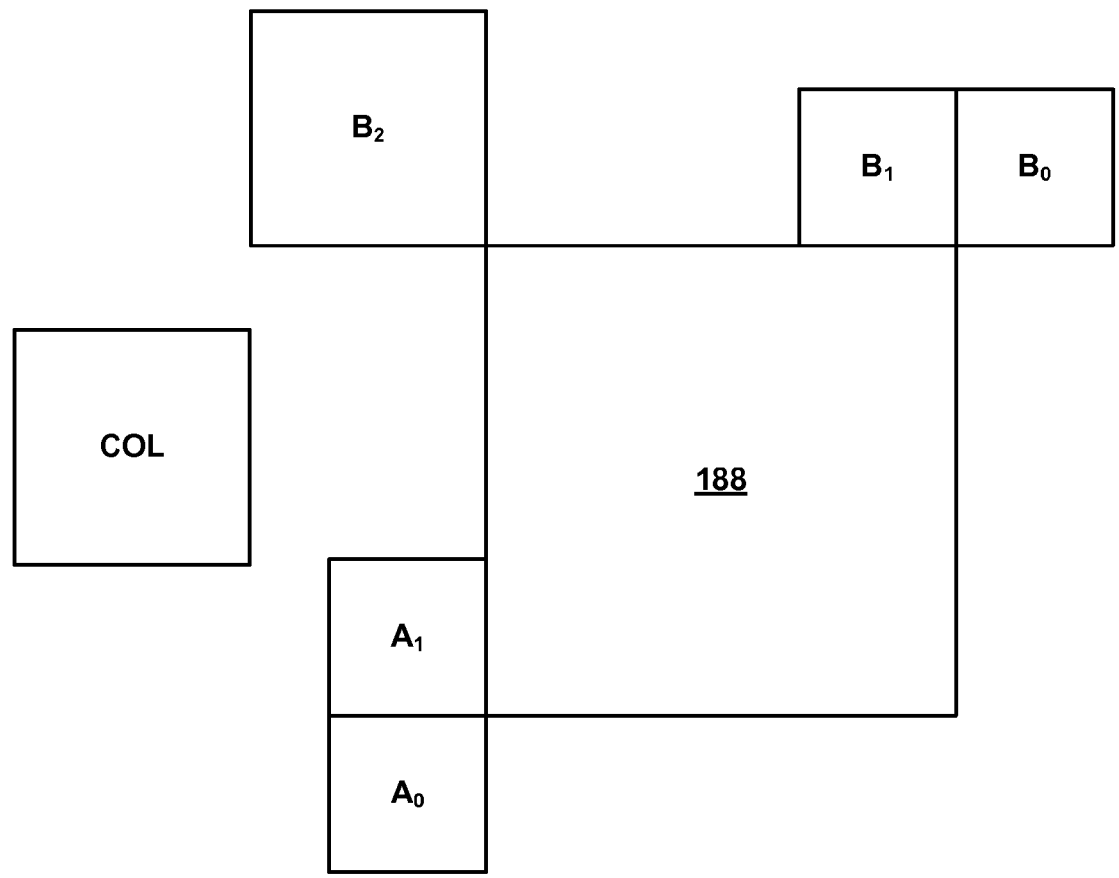
FIG. 6 is a diagram illustrating example locations for motion vector predictor candidates.

FIG. 6 is a diagram illustrating potential motion vector predictor candidates when performing motion vector prediction (including AMVP and merge mode). That is, for block 188 currently being coded, motion information (e.g., a motion vector comprising a horizontal component and a vertical component, motion vector indexes, prediction directions, or other information) from neighboring blocks $A_0$, $A_1$, $B_0$, $B_1$, and $B_2$ may be used to predict motion information for block 188. In addition, motion information associated with temporal co-located block COL may also be used to predict motion information for block 188 (e.g., a co-located block in a reference picture). The neighboring blocks $A_0$, $A_1$, $B_0$, $B_1$, and $B_2$ and co-located block COL, in the context of motion vector prediction, may generally be referred to below as motion vector predictor candidates.

In some examples, the motion vector predictor candidates shown in FIG. 6 may be identified when performing motion vector prediction (e.g., whether generating an MVD or performing merge mode). In other examples, different candidates may be identified when performing merge mode and motion vector prediction. That is, a video coder (such as video encoder 20 or video decoder 30) may identify a different set of motion vector predictor candidates for performing merge mode than for performing motion vector prediction.

To perform merge mode, in an example, a video encoder (such as video encoder 20) may initially determine which motion vectors from the motion vector predictor candidates are available to merge with block 188. That is, in some instances, motion information from one or more of the motion vector predictor candidates may be unavailable due to, for example, the motion vector predictor candidate being intra-coded, not yet coded, or non-existent (e.g., one or more of the motion vector predictor candidates are located in another picture or slice). Video encoder 20 may construct a motion vector predictor candidate list that includes each of the available motion vector predictor candidate blocks.

After constructing the candidate list, video encoder 20 may select a motion vector from the candidate list to be used as the motion vector for current block 100. In some examples, video encoder 20 may select the motion vector from the candidate list that best matches the motion vector for block 188. That is, video encoder 20 may select the motion vector from the candidate list according to a rate distortion analysis.

Video encoder 20 may provide an indication that block 188 is encoded using merge mode. For example, video encoder 20 may set a flag or other syntax element indicating that the motion vector for block 188 is predicted using merge mode. In an example, video encoder 20 may indicate that inter prediction parameters for block 188 are inferred from a motion vector predictor candidate by setting merge_flag [x0][y0]. In this example, the array indices x0, y0 may specify the location (x0, y0) of the top-left luma sample of the prediction block relative to the top-left luma sample of the picture (or slice).

In addition, in some examples, video encoder 20 may provide an index identifying the merging candidate from which block 188 inherits its motion vector. For example, merge_idx [x0][y0] may specify the merging candidate index, which identifies a picture in the merging candidate list and where x0, y0 specifies the location (x0, y0) of the top-left luma sample of the prediction block relative to the top-left luma sample of the picture (or slice).

A video decoder (such as video decoder 30) may perform similar steps to identify the appropriate merge candidate when decoding block 188. For example, video decoder 30 may receive an indication that block 188 is predicted using merge mode. In an example, video decoder 30 may receive merge_flag [x0][y0], where (x0, y0) specify the location of the top-left luma sample (corresponding to a pixel in the block) of the prediction block relative to the top-left luma sample of the picture (or slice). While described with respect to luma samples, the techniques described above may also be performed for chroma samples.

In some examples, video decoder 30 may scale the motion vector predictor before merging the motion information of the candidate block with block 188. For example, if the motion vector predictor refers to a predictive block in a reference picture that is located in a different temporal location than the predictive block referred to by block 188 (e.g., the actual motion vector for block 188), video decoder 30 may scale the motion vector predictor. For example, video decoder 30 may scale the motion vector predictor so that it refers to the same reference picture as the reference picture for block 188. In some examples, video decoder 30 may scale the motion vector predictor according to a difference in picture order count (POC) values. After selecting the motion vector predictor, video decoder 30 may merge the motion information associated with the motion vector predictor with the motion information for block 188.

In addition, video decoder 30 may construct a merge candidate list. For example, video decoder 30 may receive one or more syntax elements (e.g., flags) indicating video blocks that are available for motion vector prediction. Video decoder 30 may construct a merge candidate list based on the received flags. If several merging candidates have the same motion vectors and the same reference indices, some of the redundant merging candidates may be removed (i.e., pruned) from the list.

Video decoder 30 may identify the appropriate merge candidate according to a received index. For example, video decoder 30 may receive an index identifying the merging candidate from which block 188 inherits its motion vector. In an example, merge_idx [x0] [y0] may specify the merging candidate index, which identifies a picture in merging candidate list and where x0, y0 specifies the location (x0, y0) of the top-left luma sample of the prediction block relative to the top-left luma sample of the picture (or slice).

A similar process may be implemented by video encoder 20 and video decoder 30 to perform motion vector prediction for a current block of video data. For example, video encoder 20 may initially determine which motion vectors from the motion vector predictor candidates are available to be used as MVPs. Motion information from one or more of the motion vector predictor candidates may be unavailable due to, for example, the motion vector predictor candidate being intra-coded, not yet coded, or non-existent (e.g., not included in the picture or slice, such as blocks above a top row of blocks in a picture or slice).

To determine which of the motion vector predictor candidates are available, video encoder 20 may analyze each of the motion vector predictor candidates in turn according to a predetermined priority based scheme. For example, for each motion vector predictor candidate, video encoder 20 may determine whether the motion vector predictor refers to the same reference picture as the actual motion vector for block 188. If the motion vector predictor refers to the same reference picture, video encoder 20 may add the motion vector predictor candidate to an MVP candidate list. If the motion vector predictor does not refer to the same reference picture, the motion vector predictor may be scaled (e.g., scaled based on POC distances, as discussed above) before being added to the MVP candidate list.

With respect to co-located block COL, if the co-located block includes more than one motion vector predictor (e.g., COL is predicted as a B-frame), video encoder 20 may select one of the temporal motion vector predictors according to the current list and the current reference picture (for block 188). Video encoder 20 may then add the selected temporal motion vector predictor to the motion vector predictor candidate list.

Video encoder 20 may signal that one or more motion vector predictors are available by setting an enable_temporal_mvp_flag. After building the candidate list, video encoder 20 may select a motion vector from the candidates to be used as the motion vector predictor for block 100. In some examples, video encoder 20 may select the candidate motion vector according to a rate distortion analysis.

Video encoder 20 may signal the selected motion vector predictor using an MVP index (mvp_flag) that identifies the MVP in the candidate list. For example, video encoder 20 may set mvp_l0_flag[x0][y0] to specify the motion vector predictor index of list 0, where x0, y0 specify the location (x0, y0) of the top-left luma sample of the candidate block relative to the top-left luma sample of the picture. In another example, video encoder 20 may set mvp_l1_flag[x0][y0] to specify the motion vector predictor index of list 1, where x0, y0 specify the location (x0, y0) of the top-left luma sample of the candidate block relative to the top-left luma sample of the picture. In still another example, video encoder 20 may set mvp_lc_flag[x0][y0] to specify the motion vector predictor index of list c, where x0, y0 specify the location (x0, y0) of the top-left luma sample of the candidate block relative to the top-left luma sample of the picture.

Video encoder 20 may also generate a motion vector difference value (MVD). The MVD may constitute the difference between the selected motion vector predictor and the actual motion vector for block 188. Video encoder 20 may signal the MVD with the MVP index.

Video decoder 30 may perform similar operations to determine a motion vector for a current block using a motion vector predictor. For example, video decoder 30 may receive an indication in a parameter set (e.g., a picture parameter set (PPS)) indicating that motion vector prediction is enabled for one or more pictures. That is, in an example, video decoder 30 may receive an enable_temporal_mvp_flag in a PPS. When a particular picture references a PPS having an enable_temporal_mvp_flag equal to zero, the reference pictures in the reference picture memory may be marked as "unused for temporal motion vector prediction."

If motion vector prediction is implemented, upon receiving block 188, video decoder 30 may construct an MVP candidate list. Video decoder 30 may use the same scheme discussed above with respect to video encoder 20 to construct the MVP candidate list. In some instances, video decoder 30 may perform motion vector scaling similar to that described above with respect to video encoder 20. For example, if a motion vector predictor does not refer to the same reference picture as block 188, the motion vector predictor may be scaled (e.g., scaled based on POC distances, as discussed above) before being added to the MVP candidate list. Video decoder 30 may identify the appropriate motion vector predictor for block 188 using a received MVP index (mvp_flag) that identifies the MVP in the candidate list. Video decoder 30 may then generate the motion vector for block 100 using the MVP and a received MVD.

It should be understood that the motion vector predictor candidate blocks shown in FIG. 6 are provided for purposes of example only, and that more, fewer, or different blocks may be used for purposes of predicting motion information.

In any case, a video coder (such as video encoder 20 or video decoder 30) may store, or buffer motion information for $A_0$, $A_1$, $B_0$, $B_1$, $B_2$, and collocated block COL, so that such data is available generating an MVD or performing merge mode. For example, the video coder may store motion information (e.g., motion vectors, reference picture indexes, prediction directions, or other information) of above-neighboring blocks $B_0$, $B_1$, and $B_2$ in a line buffer that extends the width of a picture containing the blocks, so that the motion information is available to be referred to during inter-prediction of block 188.

However, as noted above, the amount of data stored to the line buffer may be relatively large. For example, a 1920× 1080 pixel picture (e.g., for 1080 p video) may include a width having as many as 495 blocks of 4×4 pixels, each block potentially having its own motion information. Moreover, there may be up to 16 reference pictures available for coding each picture. Accordingly, when all motion information for each block of a picture in the line buffer is stored, the video coder may be required to store a relatively substantial amount of data to the line buffer.

According to aspects of this disclosure, a video coder (such as video encoder 20 or video decoder 30) may limit the number of locations from which motion information is determined for block 188 to reduce the amount of data that is stored to a line buffer during coding. That is, for example, rather than determining motion information (e.g., an MVP or merge candidate) for coding block 188 from all of $A_0$, $A_1$, $B_0$, $B_1$, and $B_2$, the video coder may determine motion information for block 188 based on only a sub-set of the candidates. According to aspects of this disclosure, the video coder may determine motion information for block 188 based on left-neighboring blocks $A_1$ and $A_0$ and co-located block COL, but not based on above-neighboring blocks $B_0$, $B_1$, or $B_2$. That is, for example, the video coder may determine motion information for block 188 only based on left-neighboring blocks $A_1$ and $A_0$ and co-located block COL. In this example, the video coder may avoid storing the motion information associated with above-neighboring blocks $B_0$, $B_1$, or $B_2$ to a line buffer, because the motion information is not used to determine an MVP or merge candidate for coding block 188.

In other examples, the video coder may determine the motion information for block 188 based on one or more of above-neighboring blocks $B_0$, $B_1$, or $B_2$, (e.g., in addition to $A_1$ and $A_0$ and co-located block COL) but only when the above-neighboring blocks are from the same LCU as current block 188. In such an example, the motion information for the above-neighboring blocks $B_0$, $B_1$, or $B_2$ may be available (without being stored in a line buffer), because all information of an LCU is typically available during coding of the LCU. A variety of other techniques, as described below, may also be used to reduce the amount of motion information that is buffered during video coding.

Figure 7:
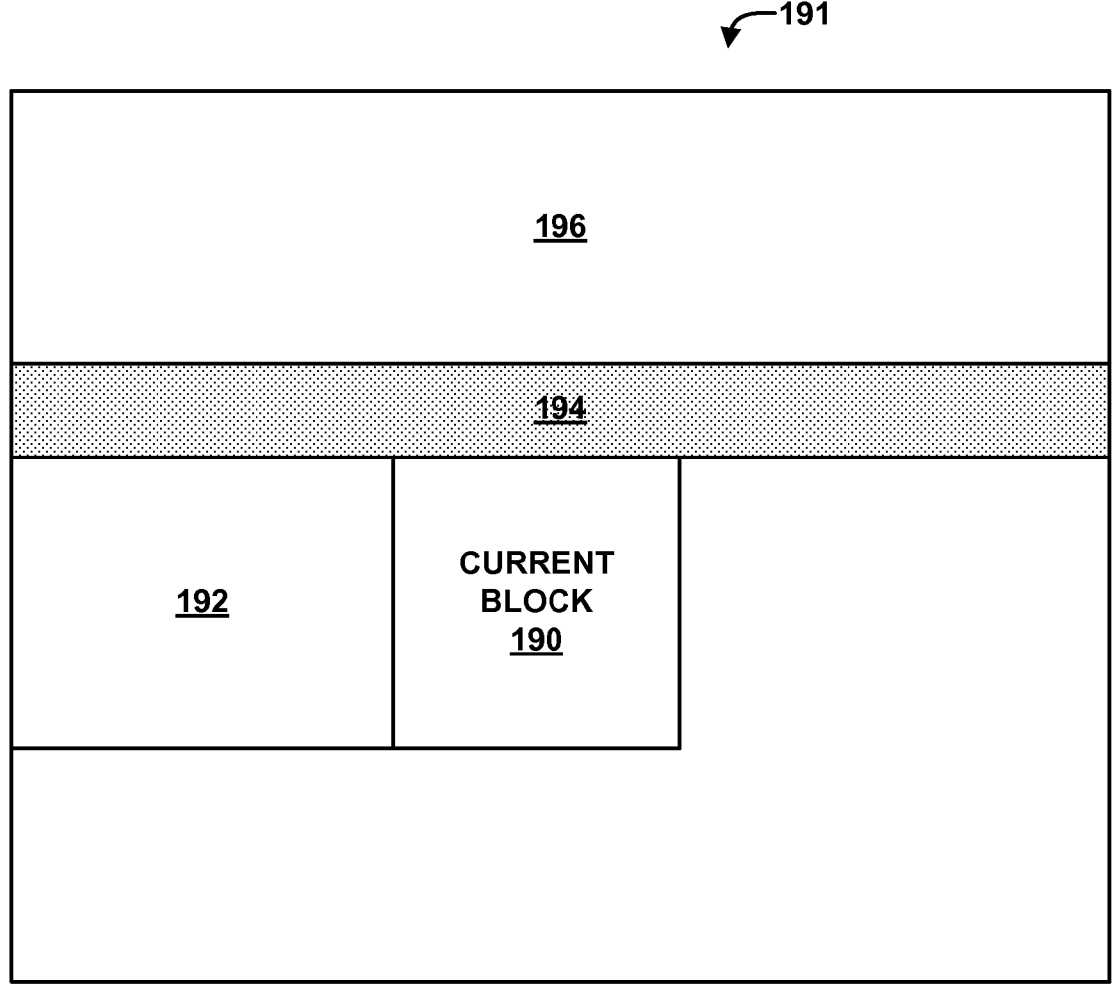
FIG. 7 is a diagram illustrating example neighboring blocks from which prediction information may be determined for coding a block.
Figure 8:
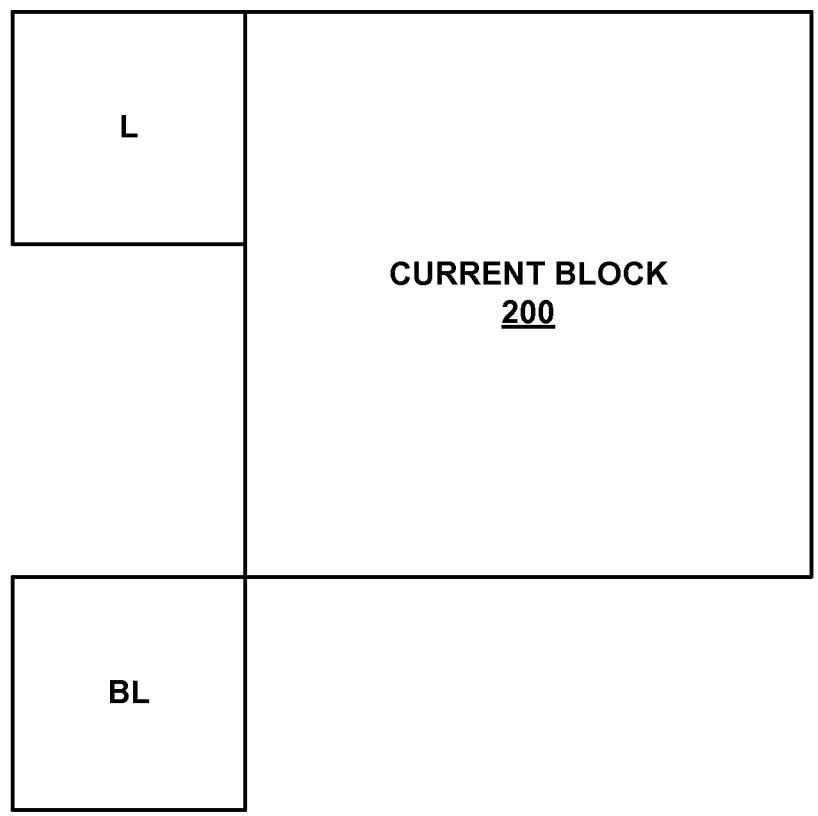
FIG. 8 is another diagram illustrating example neighboring blocks from which prediction information may be determined for coding a block.

FIG. 7 is a block diagram illustrating example neighboring blocks from which prediction information may be determined, according to aspects of this disclosure. The example shown in FIG. 7 is generally described as being performed by a video coder. It should be understood that, in some examples, the technique of FIG. 7 may be carried out by video encoder 20 (FIGS. 1 and 2) or video decoder 30 (FIGS. 1 and 3), described above. In other examples, the technique of FIG. 7 may be performed by a variety of other processors, processing units, hardware-based coding units such as encoder/decoders (CODECs), and the like.

The video coder may currently be coding (e.g., inter-coding or intra-coding) current block 190 of coded unit 191. Coded unit 191 may generally include a predefined quantity of video data including multiple blocks of the video data, such as, for example, an LCU, a slice, a tile or set of tiles, a set of wavefronts, or any other predefined unit that includes multiple blocks of video data. While above-neighboring blocks 194, left neighboring blocks 192, and blocks 196 are generally shown as undivided blocks in the example of FIG. 7, it should be understood that such blocks may be divided into one or more smaller blocks.

According to aspects of this disclosure, rather than using prediction information from above-neighboring blocks 194 for coding block 190, the video coder may only use prediction information (e.g., intra or inter prediction information) from left-neighboring blocks 192. For example, the video coder may not use data from above-neighboring blocks 194 or previously coded blocks 196 that are not positioned adjacent to current block 190 when performing inter-prediction or intra-prediction for current block 190. In this example, the video coder may buffer less data than if prediction information for all neighboring blocks (e.g., as shown in FIGS. 5 and 6) is used during coding. For example, assuming a maximum LCU size of 64×64 pixels and a smallest CU size of 4×4 pixels, video decoder 30 may potentially buffer data associated with just 16 blocks of video data (e.g., 64/4=16 potential left-neighboring blocks).

By limiting the locations from which context information is derived, as shown and described in the example of FIG. 7, the video coder may reduce the amount of data that is buffered for purposes of prediction. In addition, the video coder may increase parsing throughput. For example, as noted above, a video decoder (such as video decoder 30) may parse received video data according to a particular parsing process (e.g., wavefront parsing). In examples in which video decoder 30 does not determine prediction information from certain neighboring blocks such as above-neighboring blocks 194, video decoder 30 may eliminate dependencies to improve parsing throughput and the ability to process video data in parallel. In addition, eliminating dependencies may reduce the potential for prediction derivation errors, thereby further improving the parsing process.

FIG. 8 is another block diagram illustrating example neighboring blocks from which prediction information may be determined for coding a block. In the example shown in FIG. 8, a video coder (such as video encoder 20 or video decoder 30) may determine prediction information for block 200 currently being coded based on left-neighboring block L and bottom left-neighboring block BL. In comparison to the example shown in FIG. 7, the example of FIG. 8 adds an additional left-neighboring block from which to derive prediction information.

In the example shown in FIG. 8, as with the example shown in FIG. 7, a line buffer for storing prediction information (e.g., intra-modes or motion information) for above-neighboring blocks relative to current block 200 may not be needed at all. As explained above, an LCU can be partitioned into a different arrangement of CUs. Thus, blocks L and BL of FIG. 8 may be different CUs of the same LCU.

With respect to intra-prediction, block L and block BL may both be coded using the same intra-prediction mode, but in some instances, they may be coded using different intra-prediction modes. Based on the intra-prediction mode of block L and the intra-prediction mode of block BL, a most probable intra-prediction mode for current block 200 may be determined. For example, if both blocks L and BL were coded using Mode 6 (of a predefined number of intra-modes), the most probable intra-prediction mode for block 200 might also be Mode 6. Again, Mode 6 may not be the actual prediction mode for block 200, but it may be statistically the most likely mode for block 200 given the context for block 200 (i.e. the prediction modes of blocks neighboring block 200).

In another example, in order to improve coding efficiency and avoid redundancy, if blocks L and BL have the same intra-prediction mode, a third block to the left of current block 200 may also be used in the determination of the most probable mode. It should be noted that blocks L and BL (or a third left block) need not be directly adjacent to block 200, but may be one or more columns to the left of block 200. If block L and block BL are encoded using Modes 3 and 8, respectively, then the most probable mode for block 200 might be Mode 3, Mode 8, or a different mode. The most probable mode for a particular context can selected by identifying the intra-prediction mode that is statistically most likely for that context. By avoiding use of an upper block for determining the most probable mode, the need for a line buffer storing intra-prediction modes for the upper blocks may be eliminated.

With respect to inter-prediction, motion information including a motion vector (mvx, mvy) indicating x and y coordinates of a motion vector, reference index (ref_idx) indicating a reference frame in a reference frame list, and prediction direction (inter_dir) indicating which reference frame list to use (e.g., L0 or L1), may be stored for blocks neighboring block 200. In some examples, all such motion information may be stored in corresponding line buffers. According to aspects of this disclosure, the video coder may store motion information for only block L and block BL, and exclude motion information for above-neighboring blocks.

According to some examples, the possible performance loss associated with reducing the number of candidates for motion vector prediction may be compensated for by generating additional motion candidates. For example, as shown in the example Table 1 below, a video coder may generate additional motion candidates using available motion information, such as the motion information of blocks L and BL.

TABLE 1

GENERATED MOTION CANDIDATES

| Merge idx | L0 | L0 | |
|---|---|---|---|
| 0 | mvL0_A, ref0 | | From L |
| 1 | | mvL1_B, ref0 | From BL |
| 2 | mvL0_A, ref0 | mvL1_B, ref0 | Generated |
| 3 | mvL0_A, ref0 | mvL0'_A, ref0' | Generated |
| 4 | mvL1'_B, ref0' | mvL1_B, ref0 | Generated |

As shown in the example of Table 1, a video coder may generate motion merge candidates (2), (3), and (4) using the motion information from blocks L and BL. That is, the motion information (inter_dir, ref_idx, and mv) of candidate L and BL can be used to generate the new motion candidates. In this example, mvLX_Y may represent the motion vector of list X in Y-th candidate, mvLX'_Y may represent the processed motion vector of mvLX_Y, refN in the N-th reference picture in a reference list. The generated motion information shown in Table 1 may be produced by scaling, offsetting, clipping, or otherwise modifying the existing motion information.

While the example of FIG. 8 is described with respect to L and BL, as noted above, other blocks may also be used (e.g., additional blocks, blocks not adjacent to block 200, and the like). Moreover, the techniques described with respect to merge mode (e.g., as shown in Table 1) may be similarly applied to motion vector prediction using an MVD.

Figure 9:
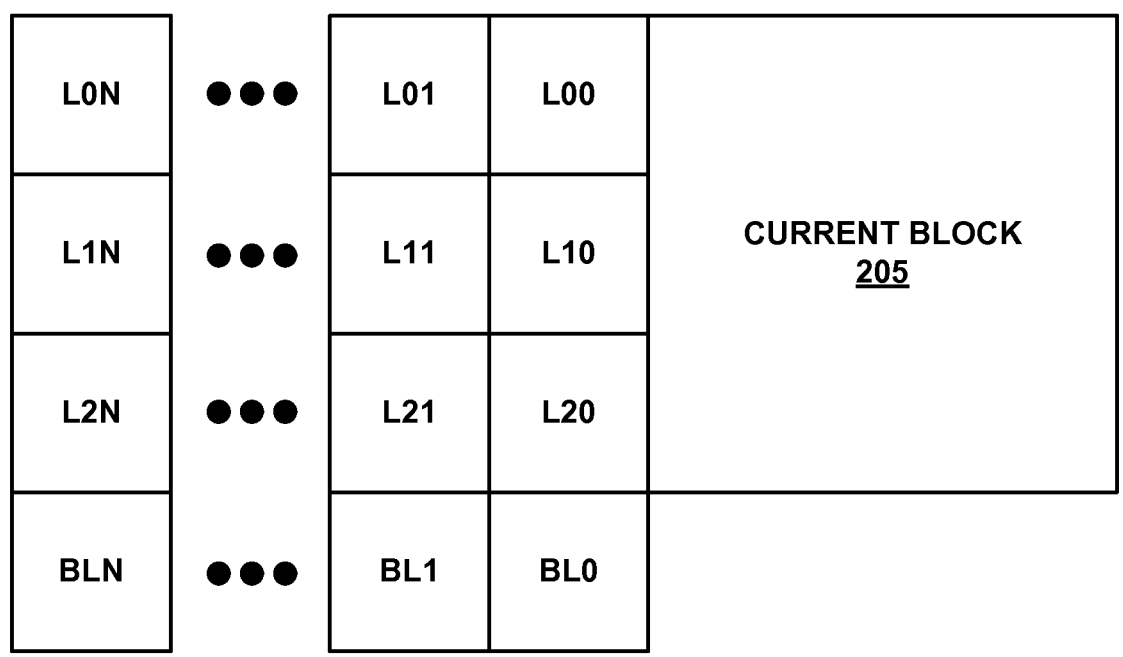
FIG. 9 is another diagram illustrating example neighboring blocks from which prediction information may be determined for coding a block.

FIG. 9 is another block diagram illustrating example neighboring blocks from which prediction information may be determined for coding a block. For example, aspects of this disclosure include determining prediction information for current block 205 based on a plurality of left-neighboring blocks L00-L0N, L10-L1N, L20-L2N, BL0-BLN, and so on. In some examples, the video coder may determine prediction information based on blocks from more than one column to the left of the block being coded. That is, with respect to inter-coding, the final motion vector candidate list may be constructed by blocks selected from the plurality of left-neighboring blocks. With respect to intra-coding, the intra-modes from the plurality of left-neighboring blocks may be used for a most probable mode derivation.

Additional left-neighboring blocks (e.g., to the left of bordering blocks LN0), as shown in the example of FIG. 9, may be used to offset possible coding performance loss associated with not buffering prediction information of left-neighboring blocks. For example, in some instances, an intra-mode of an above-neighboring block may match that of block 205. In other instances, a motion vector associated with an above-neighboring block may match or nearly match the motion vector of block 205. In these instances, preventing a video coder from retrieving data of above-neighboring blocks during coding may lead to coding performance loss, as a video coder may be forced to find a less accurate predictor. However, by increasing the number of left-neighboring blocks from which data may be retrieved by the video coder for determining prediction information, the potential for finding a relatively high quality predictor may increase.

In some examples, the left-neighboring blocks shown in FIG. 9 may be different CUs that form part of the same LCU. In other examples, the left-neighboring blocks may be included in different LCUs.

Figure 10:
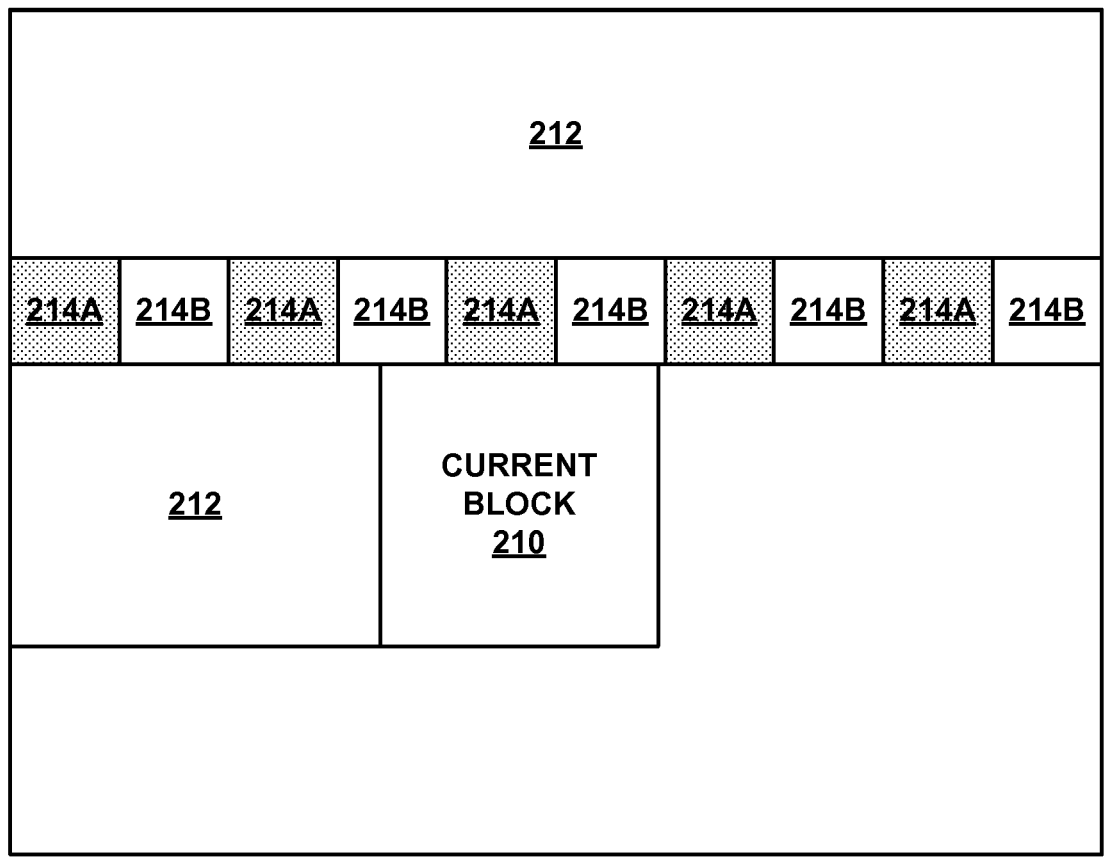
FIG. 10 is another diagram illustrating example neighboring blocks from which prediction information may be determined for coding a block.

FIG. 10 is another diagram illustrating example neighboring blocks from which prediction information may be determined for coding a block. For example, in contrast to refraining from storing any data associated with above-neighboring blocks, another way to reduce the line buffer data for prediction purposes (e.g., inter-coding or intra-coding) is to reduce the number of blocks that are stored to a line buffer. In the example shown in FIG. 10, block 210 is currently being coded, while blocks 212 have been previously coded. In some examples, prediction information (e.g., intra-modes or motion information) associated with blocks 214A and 214B (collectively, blocks 214) may be stored to a line buffer.

According to aspects of this disclosure, however, only a sub-set of the data associated with blocks 214 may be stored to the line buffer. That is, in the example shown in FIG. 10, prediction information associated with blocks 214A may be stored to a line buffer, while prediction information associated with blocks 214B may be omitted from the line buffer. While the example of FIG. 10 shows blocks 214A and 214B being of equal size, in other examples, a different sub-sampling scheme may be implemented that allows only a portion of the prediction information of blocks 214 to be stored to a line buffer. That is, in other examples, blocks 214A may be bigger or smaller than blocks 214B.

In the example shown in FIG. 10, if a video coder (such as video encoder 20 or video decoder 30) needs to determine prediction information from one of blocks 214A, the video coder can read the prediction information from the buffer. That is, for example, if one of blocks 214A includes context for a most probable mode determination for block 210, the video coder may read the intra-mode from the line buffer.

Alternatively, if the video coder needs to determine prediction information from one of blocks 214B, the video coder can derive prediction information for the block based on the subset of prediction information stored in the buffer. The derivation may, for example, be based on copying the prediction information for one or more nearby blocks 214A that are stored in the buffer, interpolating the motion information that are stored in the buffer, or deriving prediction information in some other manner based on the prediction information stored for blocks 214A.

Figure 11:
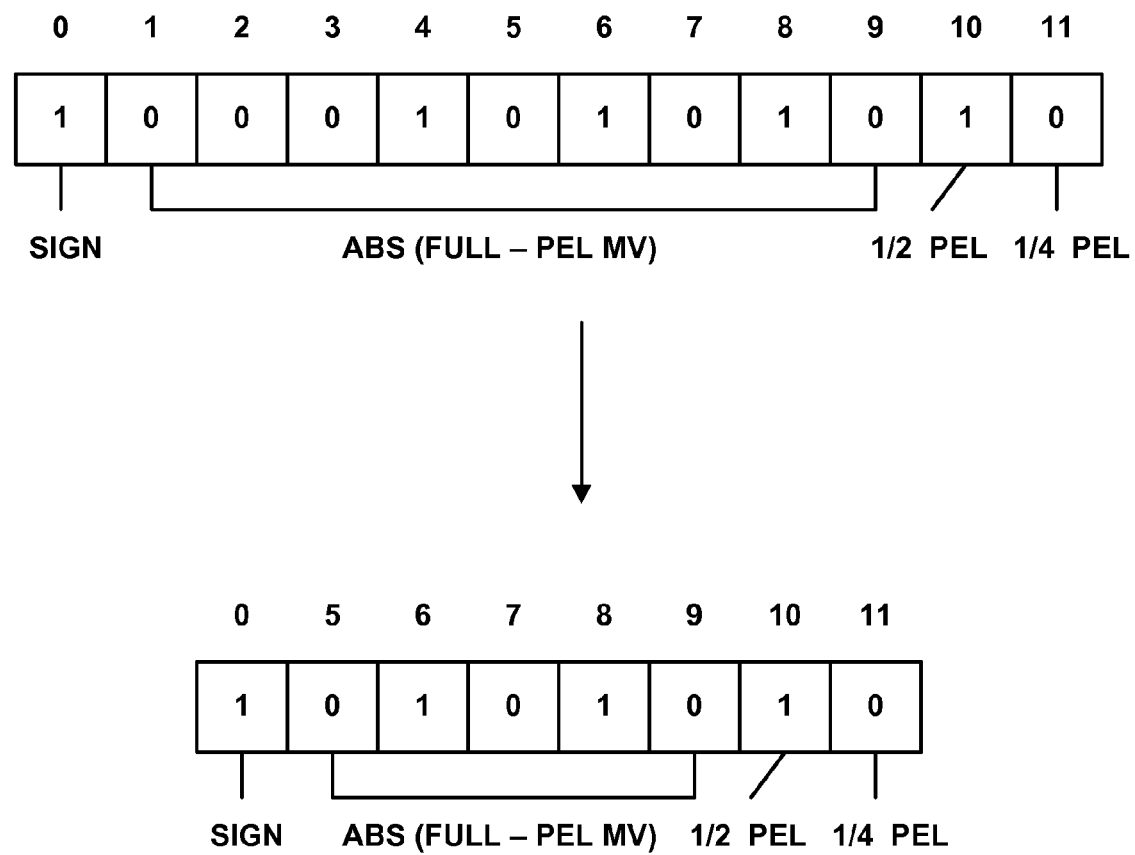
FIG. 11 is a conceptual diagram illustrating an example of clipping prediction information of one or more neighboring blocks.

FIG. 11 is a conceptual diagram illustrating an example of clipping (e.g., reducing the bit depth) motion vectors stored to a buffer. That is, for example, another way to reduce the amount of prediction information that is stored to a line buffer (and, more specifically, motion vectors for inter-prediction) may be to reduce the number of bits that are used when storing each component of each motion vector.

In this example, as shown in the example of FIG. 11, each motion vector stored to a line buffer (e.g., motion vectors associated with upper-neighboring blocks) may be clipped to N bits, where each motion vector is originally M bits (M is larger than N). In the example of FIG. 11, M is equal to 12 and N is equal to 8, although other numbers of bits may also be implemented. It should be understood that the particular representation of integers shown in FIG. 11 may not correspond to the physical representation (known as 2-complement arithmetic), but is provided for purposes of explanation. With the example bit clipping shown in FIG. 11, the maximum range of a motion vector without sub-pixel ("sub-pel") accuracy is 64. When the motion is small, this clipping may have relatively little or no impact on coding efficiency.

Figure 12:
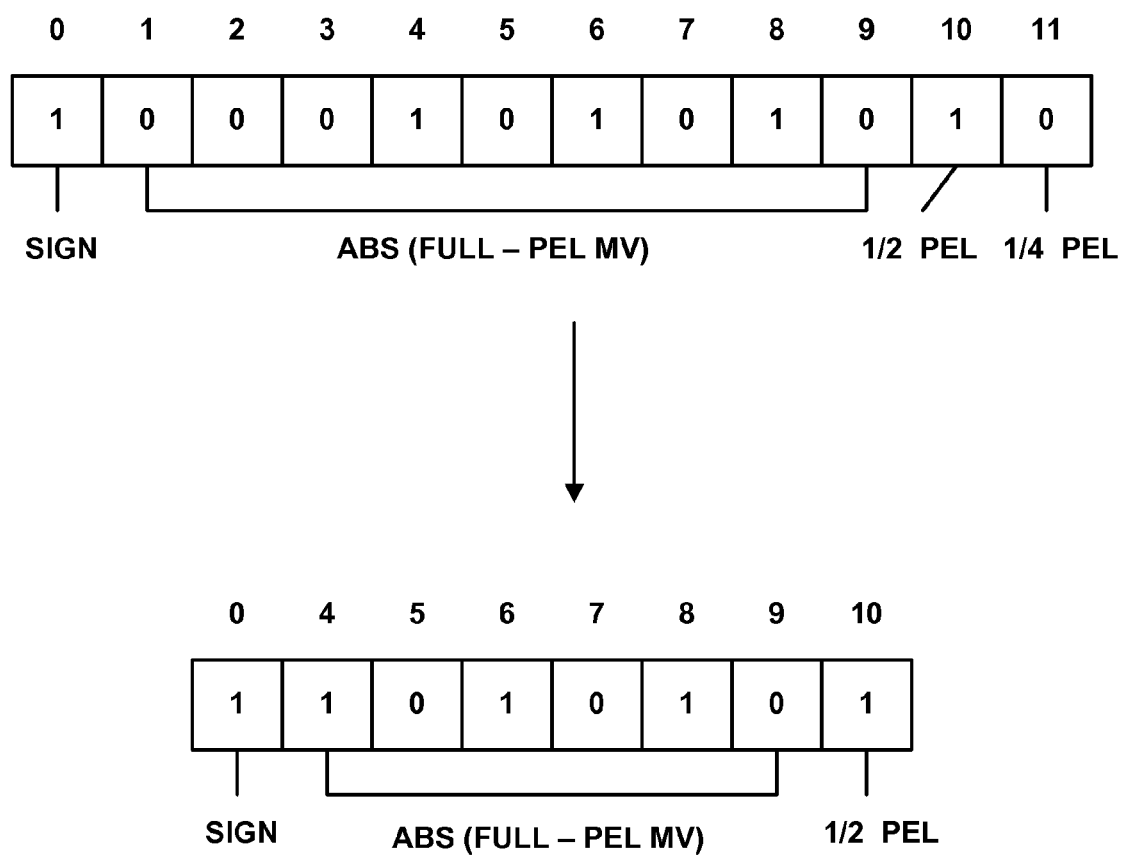
FIG. 12 is another conceptual diagram illustrating an example of clipping prediction information of one or more neighboring blocks.

FIG. 12 is another conceptual diagram illustrating an example of clipping motion vectors stored to a line buffer. For example, if the relevant motion vector is relatively large, fewer significant bits may be clipped. That is, in the example of FIG. 12, three most significant bits and one of the sub-pel bits have been clipped. More specifically, in the example of FIG. 12, the ¼-pel or the sub-pel accuracy is removed and the 3 most significant bits are removed, although a different configuration may be implemented. The number of bits removed from the most or least significant bits (e.g., as shown in FIGS. 11 and 12) may be specified in a parameter set, such as an SPS or PPS.

Figure 13:
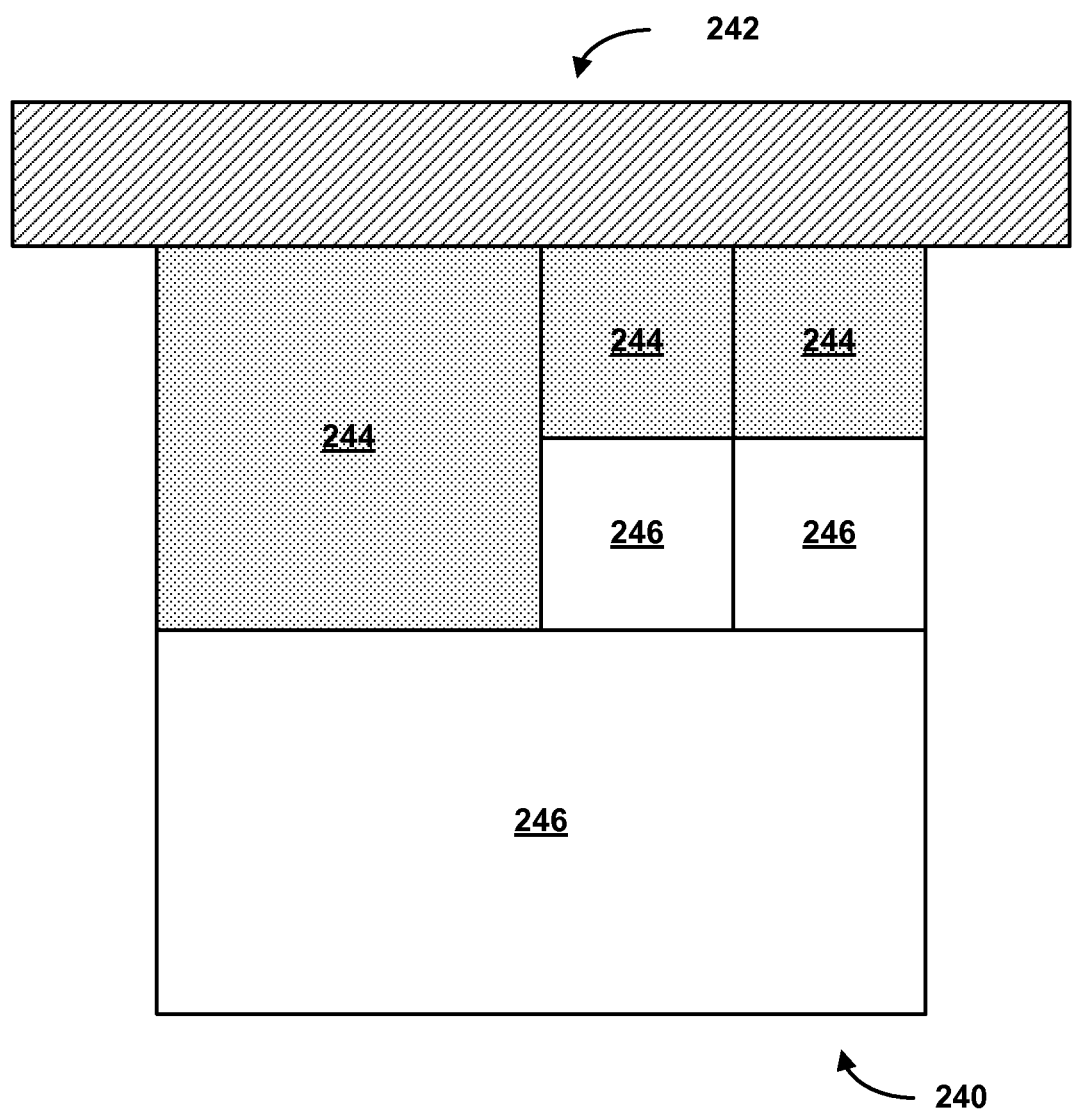
FIG. 13 is a block diagram illustrating boundary coding units of a largest coding unit.

FIG. 13 is a diagram illustrating boundary CUs of an LCU. For example, LCU 240 is bordered by blocks 242, which may include one or more other LCUs. In the example shown in FIG. 13, LCU 240 includes boundary CUs 244 that share a border with blocks 242 and interior CUs 246 that do not share a border with blocks 242. Each of the CUs of LCU 240 may have associated PUs.

In some examples, as described above, a video coder may code the PUs of LCU 240 using prediction information (e.g., intra-modes or motion information) from above-neighboring blocks. Prediction information for above-neighboring PUs of CUs 246 may be readily available, as such PUs are included in the same LCU 242. However, in order to access prediction information from above-neighboring blocks 242 when coding a boundary PUs of CU 244, a video coder must access such information from a different LCU than the LCU 240 being coded. In order to be available, e.g., without accessing a memory external to the video coder, the video coder may store such above-neighboring prediction information to a line buffer.

Applying this uniform scheme for all PUs of LCU 240 (that includes a buffer to store information for boundary CUs 244) may aid in hardware implementation simplicity. That is, all PUs may access prediction information from the same relative locations. However, excluding data from above-neighboring blocks 242, in a different LCU than the LCU containing blocks 244, 246, from being retrieved during coding may reduce the amount of data that is stored to a line buffer. Moreover, excluding data from above-neighboring blocks 242 from being retrieved during coding may also minimize the impact of inaccuracies that may be introduced from relying on CUs outside of LCU 240, thereby improving coding performance. That is, if data from the above-neighboring blocks 242 form a portion of another slice that is lost or otherwise corrupted, the video coder may still code boundary CUs 244.

Accordingly, the techniques described throughout this disclosure may be applied to only to a sub-set of PUs of an LCU. That is, for example, the techniques for limiting the amount of data stored to a line buffer may only be applied only to boundary CUs 244 of LCU 240, which may need access to the line buffer.

Figure 14:
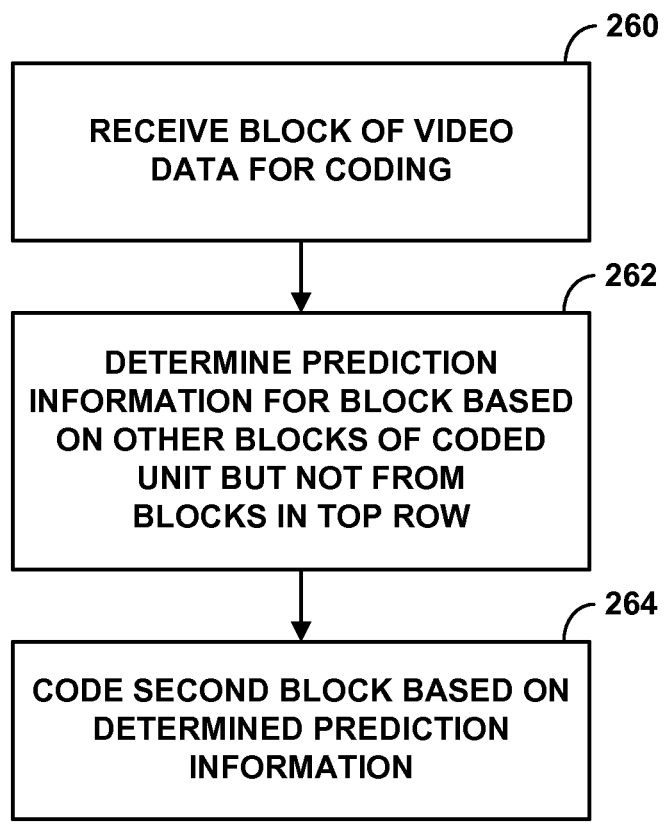
FIG. 14 is a flow diagram illustrating example techniques for reducing the amount of prediction information that is buffered during video coding.

FIG. 14 is a flow diagram illustrating example techniques for reducing the amount of prediction information that is buffered during video coding. The example shown in FIG. 14 is generally described as being performed by a video coder. It should be understood that, in some examples, the technique of FIG. 14 may be carried out by video encoder 20 (FIGS. 1 and 2) or video decoder 30 (FIGS. 1 and 3), described above. In other examples, the technique of FIG. 14 may be performed by a variety of other processors, processing units, hardware-based coding units such as encoder/decoders (CODECs), and the like.

The video coder may receive a block of video data of a coded unit (e.g., a picture, slice, tile, set of wavefronts, and the like) for entropy coding (260). According to aspects of this disclosure, the block of video data may be positioned below a top row of blocks in the coded unit. In some examples, the block currently being coded may be a sub-CU that is included in the same LCU as above-neighboring sub-CUs. In other examples, the block may be positioned at the edge of an LCU, such that above-neighboring blocks belong to a different LCU than the current block.

The video coder may then determine prediction information for the block based on prediction information of one or more other blocks in the coded unit, but not based on blocks in the top row of the coded unit (262). For example, if the first block is inter-predicted, the video coder may determine motion information (e.g., motion vectors, reference picture indexes, prediction directions, or other information) associated with the first block. Alternatively, if the first block is intra-predicted, the video coder may determine an intra-mode of the first block.

In some examples, according to aspects of this disclosure, rather than determining prediction information for the block based on above-neighboring blocks, the video coder may use prediction information from left-neighboring blocks. In some examples, the left-neighboring blocks may be included within the same LCU as the block currently being coded. In other examples, the left-neighboring blocks may be included in a different LCU than the block currently being coded. As noted above, in some examples, the one or more other blocks may be positioned directly adjacent to the block currently being coded, or may be positioned several blocks from the block.

In another example, the block of video data may include one or more blocks of an LCU, and the top row of blocks may include one or more other LCUs. In such an example, according to aspects of this disclosure, the video coder may determine prediction information for the block using prediction information associated with the other blocks the LCU, but exclude the top row of above-neighboring blocks (included in other LCUs). In an example for purposes of illustration, the block being coded may include a first sub-CU of an LCU, and the above-neighboring blocks may include one or more other LCUs. Assume also that a second sub-CU is positioned above the first sub-CU (in the same LCU). In this example, the video coder may determine prediction information for the first sub-CU using information based on the second sub-CU, which is positioned above the first sub-CU.

The video coder may then code the block based on the determined prediction information (264). For example, as described in greater detail with respect to FIGS. 15 and 16 below, if the block is an intra-coded block, the video coder may code the block by determining a most probable mode for the block based on intra-prediction modes from the one or more other blocks. Alternatively, as described in greater detail with respect to FIGS. 17 and 18 below, if the current block is an inter-coded block, the video coder may code the block by determining an MVD (or merge information) based on the motion information from the one or more other blocks.

It should be understood that the steps shown and described with respect to FIG. 14 are provided as merely one example. That is, the steps of the method of FIG. 14 need not necessarily be performed in the order shown in FIG. 14, and fewer, additional, or alternative steps may be performed.

Figure 15:
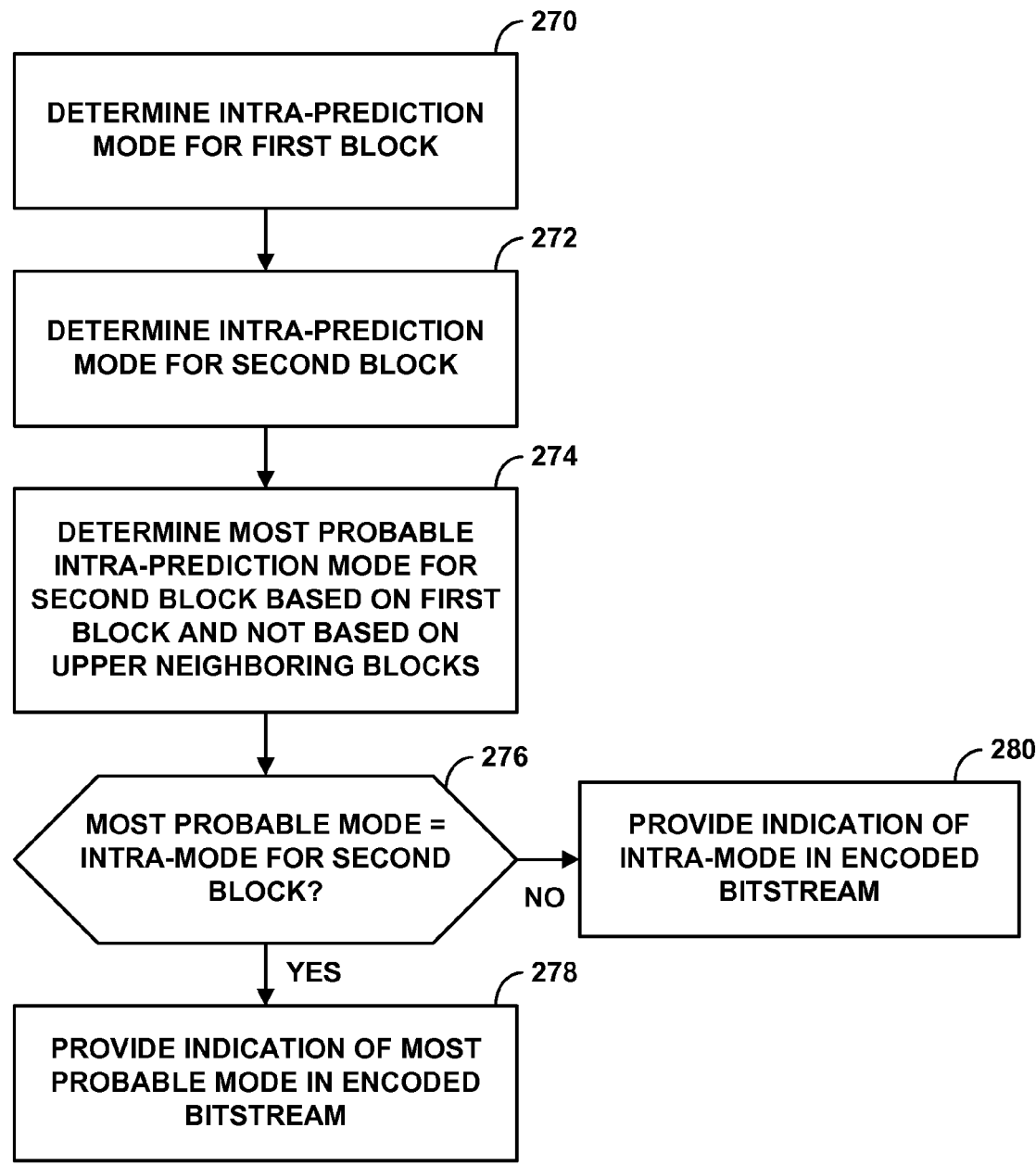
FIG. 15 is a flow diagram illustrating example techniques for reducing the amount of prediction information that is buffered when performing intra-prediction.

FIG. 15 is a flow diagram illustrating example techniques for reducing the amount of prediction information that is buffered when performing intra-prediction in video encoding. While described with respect to video encoder 20, it should be understood that the techniques described with respect to FIG. 15 may be performed by a variety of other processors, processing units, hardware-based coding units such as encoder/decoders (CODECs), and the like.

In the example shown in FIG. 15, video encoder 20 may determine an intra-prediction mode for a first block of video data (270). Video encoder 20 may also determine an intra-prediction mode for a second block of video data (272). According to aspects of this disclosure, video encoder 20 may determine an intra-prediction mode for the second block based on the intra-prediction mode for the first block, but only if the first block is not an above-neighboring block of the second block (274). If the first block is an above-neighboring block, video encoder 20 may determine the most probable intra-mode for the second block based on one or more other blocks. That is, an above-neighboring block may be excluded from being considered as the first block. In some examples, video encoder 20 may only apply the above-neighboring block limitation if the first block is from a different LCU than the second block.

Video encoder 20 may determine whether the determined most probable intra-mode is the same as the determined intra-mode for the second block (276). If the most probable intra-mode is the same as the determined intra-mode for the second block (the YES branch of step 276), video encoder may provide an indication of the most probable mode in an encoded bitstream (278). According to some examples, video encoder 20 may set a most probable mode flag in the encoded bitstream, thereby indicating that the most probable mode was used to intra-code the second block. In this example, as described in greater detail with respect to FIG. 16 below, upon decoding the most probable mode flag, a video decoder (such as video decoder 30) may reproduce the most probable mode derivation process to determine the intra-mode used to encode the second block. If the most probable intra-mode is not the same as the intra-mode for the second block (the NO branch of step 276), video encoder 20 may provide an indication of the intra-mode used to encode the block an in encoded bitstream (280).

It should be understood that the steps shown and described with respect to FIG. 15 are provided as merely one example. That is, the steps of the method of FIG. 15 need not necessarily be performed in the order shown in FIG. 15, and fewer, additional, or alternative steps may be performed.

Figure 16:
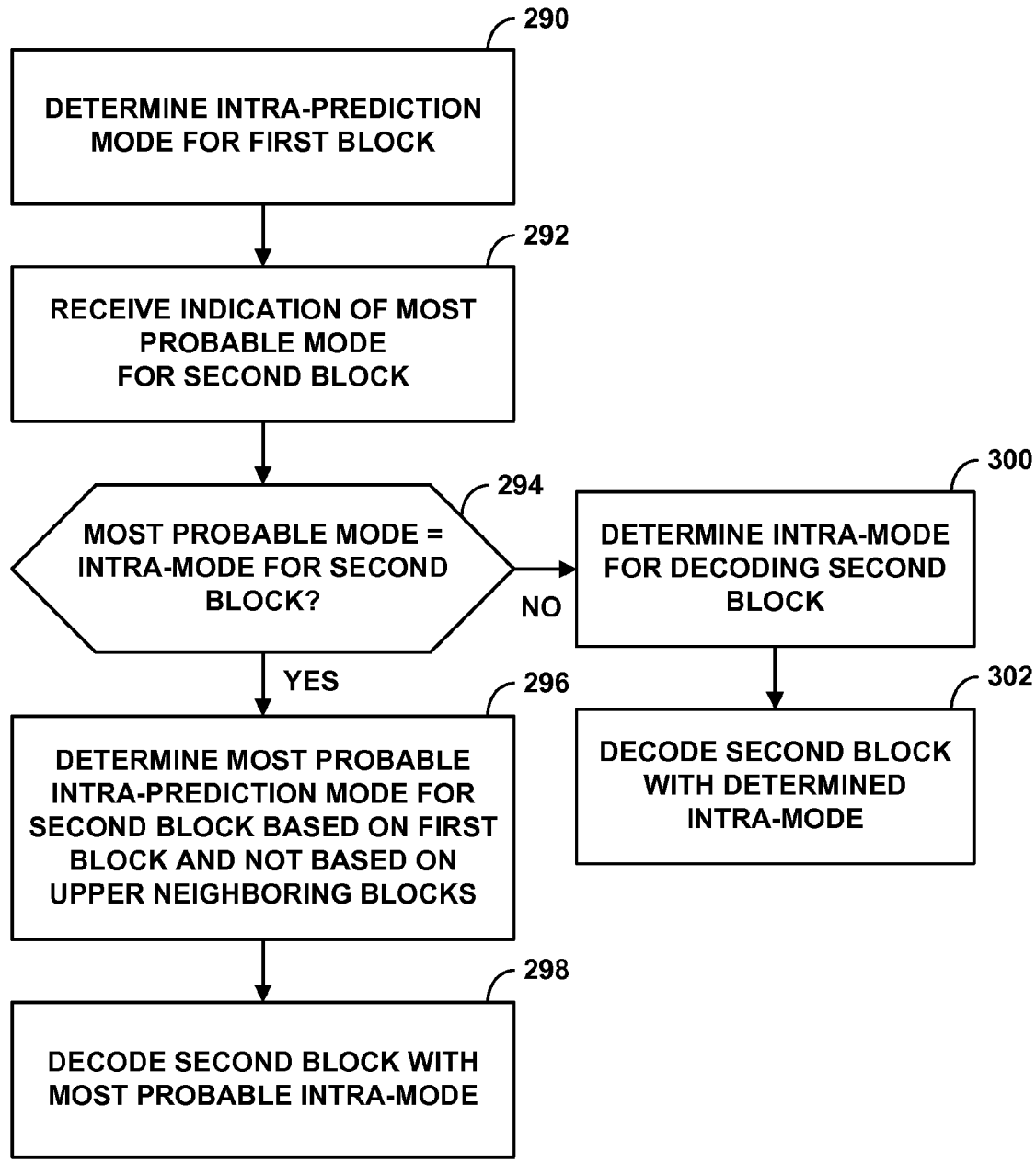
FIG. 16 is a flow diagram illustrating example techniques for reducing the amount of prediction information that is buffered when performing intra-prediction.

FIG. 16 is a flow diagram illustrating example techniques for reducing the amount of prediction information that is buffered when performing intra-prediction in video decoding. While described with respect to video decoder 30, it should be understood that the techniques described with respect to FIG. 16 may be performed by a variety of other processors, processing units, hardware-based coding units such as encoder/decoders (CODECs), and the like.

Video decoder 30 may initially determine an intra-prediction mode for a first block of video data (290). Video decoder 30 may also receive an indication of a most-probable intra-mode of a second block (292). For example, video decoder 30 may, in some examples, receive a most probable mode flag that indicates whether the most probable intra-mode was used to intra-predict the pixels of the second block.

Video decoder 30 may determine whether the most probable intra-mode is the same as the intra-mode for decoding the second block based on the received indication (294). If the most probable intra-mode is the appropriate intra-mode for decoding the second block (the YES branch of step 294), video decoder 30 may determine the most probable intra-mode for the second block (296). For example, according to aspects of this disclosure, video decoder 30 may determine an intra-prediction mode for the second block based on the intra-prediction mode for the first block, but only if the first block is not an above-neighboring block of the second block. If the first block is an above-neighboring block, video decoder 30 may determine the most probable intra-mode for the second block based on one or more other blocks. In some examples, video decoder 30 may only apply the above-neighboring block limitation if the first block is from a different LCU than the second block.

Video decoder 30 may then decode the second block using the most probable intra-mode (298). That is, for example, video decoder 30 may predict the second block using the most probable intra-prediction mode, and determine the pixel values of the second block based on a combination of the predictive values and received residual values.

If the most probable intra-mode is not the appropriate intra-mode for decoding the second block (the NO branch of step 294), video decoder 30 may determine an intra-mode for decoding the second block, for example, based on some received signaling (300). In other examples, video decoder 30 may apply a default intra-mode for the second block. In any case, video decoder 30 may then decode the second block based on the determined intra-mode (302). That is, for example, video decoder 30 may predict the second block using the determined intra-prediction mode, and determine the pixel values of the second block based on a combination of the predictive values and received residual values.

It should be understood that the steps shown and described with respect to FIG. 16 are provided as merely one example. That is, the steps of the method of FIG. 16 need not necessarily be performed in the order shown in FIG. 16, and fewer, additional, or alternative steps may be performed.

Figure 17:
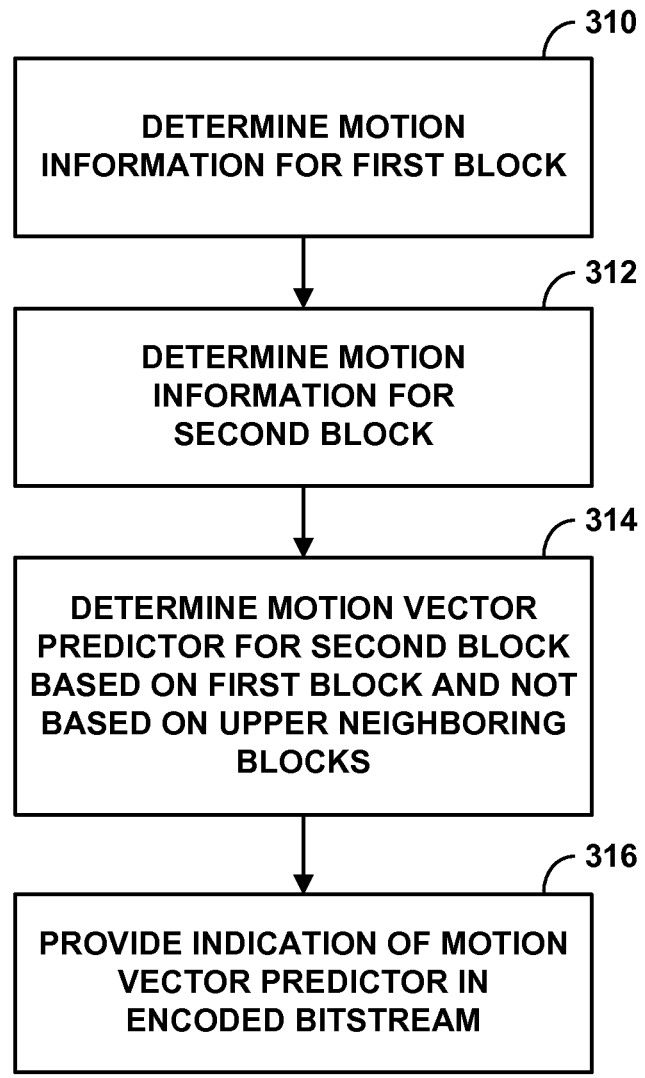
FIG. 17 is a flow diagram illustrating example techniques for reducing the amount of prediction information that is buffered when performing inter-prediction.

FIG. 17 is a flow diagram illustrating example techniques for reducing the amount of prediction information that is buffered when performing inter-prediction in video encoding. While described with respect to video encoder 20, it should be understood that the techniques described with respect to FIG. 17 may be performed by a variety of other processors, processing units, hardware-based coding units such as encoder/decoders (CODECs), and the like.

In the example of FIG. 17, video encoder 20 may determine motion information for a first block of video data (310). Video encoder 20 may also determine motion information for a second block of video data (312). According to aspects of this disclosure, video encoder 20 may determine an MVP for the second block based on a motion vector for the first block, but only if the first block is not an above-neighboring block of the second block (314). If the first block is an above-neighboring block, video encoder 20 may determine an MVP for the second block based on one or more other blocks. In some examples, video encoder 20 may only apply the above-neighboring block limitation if the first block is from a different LCU than the second block.

Video encoder 20 may also provide an indication of the determined MVP in an encoded bitstream (316). That is, video encoder 20 may identify the block from which the MVP belongs. In addition, video encoder 20 may included an MVD in the encoded bitstream with the MVP.

Although described with respect to determining an MVP and generating an MVD, it should be understood that the techniques described with respect to FIG. 17 may also be used for merge mode. It should also be understood that the steps shown and described with respect to FIG. 17 are provided as merely one example. That is, the steps of the method of FIG. 17 need not necessarily be performed in the order shown in FIG. 17, and fewer, additional, or alternative steps may be performed.

Figure 18:
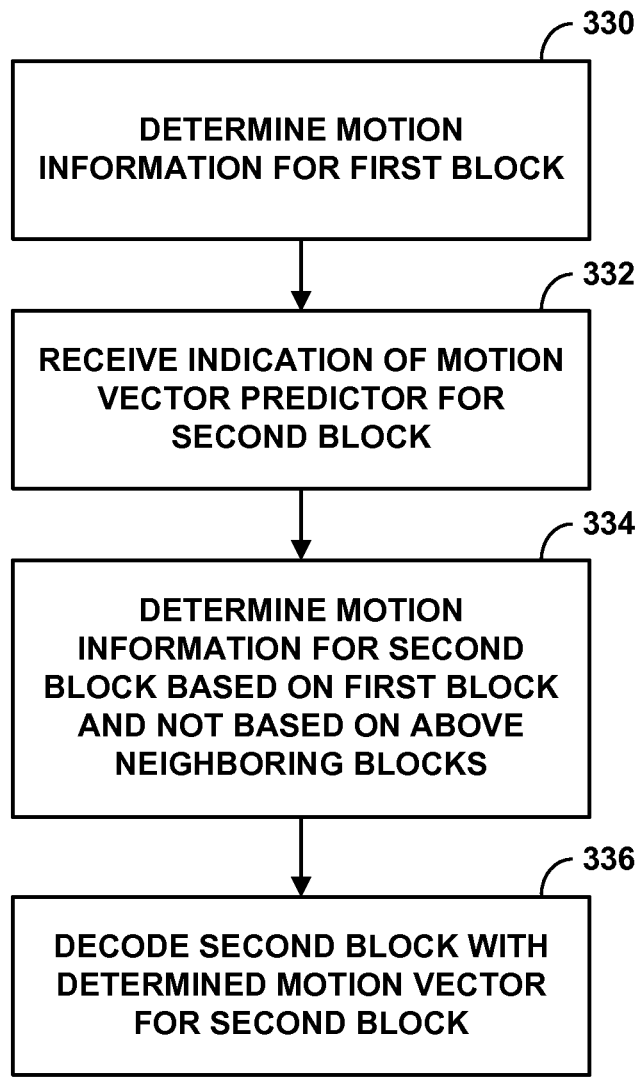
FIG. 18 is a flow diagram illustrating example techniques for reducing the amount of prediction information that is buffered when performing inter-prediction.

FIG. 18 is a flow diagram illustrating example techniques for reducing the amount of prediction information that is buffered when performing inter-prediction in video encoding. While described with respect to video decoder 30, it should be understood that the techniques described with respect to FIG. 18 may be performed by a variety of other processors, processing units, hardware-based coding units such as encoder/decoders (CODECs), and the like.

In the example shown in FIG. 18, video decoder 30 may determine motion information for a first block of video data (330). Video decoder 30 may also receive an indication of a motion vector predictor for a second block of video data (332). According to aspects of this disclosure, video decoder 30 may determine an MVP for the second block based on a motion vector for the first block, but only if the first block is not an above-neighboring block of the second block (334). That is, video decoder 30 may only add a motion vector from the first block to an MVP candidate list if the first block is not an above-neighboring block of the second block. If the first block is an above-neighboring block, video decoder 30 may determine an MVP for the second block based on one or more other blocks. In some examples, video decoder 30 may only apply the above-neighboring block limitation if the first block is from a different LCU than the second block.

Video decoder 30 may determine motion information for the second block by combining the motion vector for the first block (in instances in which the first block is used as an MVP) and a received MVD. Video decoder 30 may then decode the second block using the determined motion information (336). That is, video decoder 30 may retrieve the predictive block identified by the motion vector, and determine pixel values for the second block based on a combination of the predictive block and received residual values.

Although described with respect to determining an MVP and generating an MVD, it should be understood that the techniques described with respect to FIG. 18 may also be used for merge mode. It should also be understood that the steps shown and described with respect to FIG. 18 are provided as merely one example. That is, the steps of the method of FIG. 18 need not necessarily be performed in the order shown in FIG. 18, and fewer, additional, or alternative steps may be performed.

Moreover, it should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of coding video data, the method comprising:
   coding a first largest coded unit of a slice of video data;
   identifying, for a current block of video data that is positioned below the first largest coded unit and that neighbors the first largest coded unit and that is included in a second largest coded unit of the slice of video data, one or more blocks from which to determine one or more most probable intra-prediction modes for predicting an intra-prediction mode of the current block of video data based on a location of the one or more blocks, wherein identifying the one or more blocks comprises excluding locations of any block of the first largest coded unit;
   determining the one or more most probable intra-prediction modes based on respective intra-prediction modes of the identified one or more blocks; and
   coding data that indicates the intra-prediction mode for the current block based on the one or more most-probable intra-prediction modes.

2. The method of claim 1, wherein the first largest coded unit and the second largest coded unit are included in a single slice of video data.

3. The method of claim 1, wherein identifying the one or more blocks comprises identifying one or more left-neighboring blocks of the block.

4. The method of claim 3, wherein identifying the one or more blocks comprises identifying one or more blocks that are directly adjacent to the block.

5. The method of claim 3, wherein identifying the one or more blocks comprises identifying one or more blocks that are not directly adjacent to the block.

6. The method of claim 1, wherein identifying the one or more blocks comprises identifying a first left-neighboring first block and a second left-neighboring block that is positioned below the block.

7. The method of claim 1, wherein coding the data that indicates the intra-prediction mode for the current block comprises encoding the data block, and wherein the method further comprises:
   determining residual values for the current block using the intra-prediction mode for the current block; and
   encoding the residual values and the data that indicates the intra-prediction mode for the current block in an encoded bitstream.

8. The method of claim 1, wherein coding the data that indicates the intra-prediction mode for the current block comprises decoding the data, and wherein the method further comprises:
   decoding residual values for the current block;
   intra-predicting the block using the intra-prediction mode for the current block; and
   combining the intra-predicted residual values with received residual values of the block.

9. An apparatus for coding video data, the apparatus comprising:
   a memory configured to store video data; and
   one or more processors configured to:
      code a first largest coded unit of a slice of the video data
      identify, for a current block of video data that is positioned below the first largest coded unit and that neighbors the first largest coded unit and that is included in a second largest coded unit of the slice of video data, one or more blocks from which to determine one or more most probable intra-prediction modes for predicting an intra-prediction mode of the current block of video data based on a location of the one or more blocks, wherein to identify the one or more blocks, the one or more processors exclude locations of any block of the first largest coded unit;
      determine the one or more most probable intra-prediction modes based on respective intra-prediction modes of the identified one or more blocks; and
      code data that indicates the intra-prediction mode for the current block based on the one or more most-probable intra-prediction modes.

10. The apparatus of claim 9, wherein the first largest coded unit and the second largest coded unit are included in a single slice of video data.

11. The apparatus of claim 9, wherein to identify the one or more blocks, the one or more processors are configured to identify one or more left-neighboring blocks of the current block.

12. The apparatus of claim 11, wherein to identify the one or more blocks, the one or more processors are configured to identify one or more blocks that are directly adjacent to the current block.

13. The apparatus of claim 11, wherein to identify the one or more blocks, the one or more processors are configured to identify one or more blocks that are not directly adjacent to the current block.

14. The apparatus of claim 9, wherein to identify the one or more blocks, the one or more processors are configured to identify a first left-neighboring first block and a second left-neighboring block that is positioned below the current block.

15. The apparatus of claim 9, wherein the apparatus comprises a video encoder, and wherein to code the data that indicates the intra-prediction mode for the current block, the one or more processors are configured to encode the data, and wherein the one or more processors are further configured to:
   determine residual values for the current block using the intra-prediction mode for the current block; and
   encode the residual values and the data that indicates the intra-prediction mode for the current block in an encoded bitstream.

16. The apparatus of claim 9, wherein the apparatus comprises a video decoder, wherein to code the data that indicates the intra-prediction mode for the current block, the one or more processors are configured to decode the data, and wherein the one or more processors are further configured to:
- decode residual values for the current block;
- intra-predict the block using the intra-prediction mode for the current block; and
- combine the intra-predicted residual values with received residual values of the block.

17. A non-transitory computer-readable storage medium having instructions stored thereon that, when executed, cause one or more processors to:
- code a first largest coded unit of a slice of video data;
- identify, for a current block of video data that is positioned below the first largest coded unit and that neighbors the first largest coded unit and that is included in a second largest coded unit of the slice of video data, one or more blocks from which to determine one or more most probable intra-prediction modes for predicting an intra-prediction mode of the current block of video data based on a location of the one or more blocks, wherein to identify the one or more blocks, the instructions cause the one or more processors to exclude locations of any block of the first largest coded unit;
- determine the one or more most probable intra-prediction modes based on respective intra-prediction modes of the identified one or more blocks; and
- code data that indicates the intra-prediction mode for the current block based on the one or more most-probable intra-prediction modes.

18. The non-transitory computer-readable storage medium of claim 17, wherein the first largest coded unit and the second largest coded unit are included in a single slice of video data.

19. The non-transitory computer-readable storage medium of claim 17, wherein to identify the one or more blocks, the instructions cause the one or more processors to identify one or more left-neighboring blocks of the current block.

20. The non-transitory computer-readable storage medium of claim 17, wherein to identify the one or more blocks, the instructions cause the one or more processors to identify a first left-neighboring first block and a second left-neighboring block that is positioned below the current block.

21. An apparatus for coding video data, the apparatus comprising:
- means for coding a first largest coded unit of a slice of video data;
- means for identifying, for a current block of video data that is positioned below the first largest coded unit and that neighbors the first largest coded unit and that is included in a second largest coded unit of the slice of video data, one or more blocks from which to determine one or more most probable intra-prediction modes for predicting an intra-prediction mode of the current block of video data based on a location of the one or more blocks, wherein the means for identifying the one or more blocks comprises means for excluding locations of any block of the first largest coded unit;
- means for determining the one or more most probable intra-prediction modes based on respective intra-prediction modes of the one or more blocks; and
- means for coding data that indicates the intra-prediction mode for the current block based on the one or more most-probable intra-prediction modes.

22. The apparatus of claim 21, wherein the first largest coded unit and the second largest coded unit are included in a single slice of video data.

23. The apparatus of claim 21, wherein the means for identifying the one or more blocks comprises means for identifying one or more left-neighboring blocks of the block.

24. The apparatus of claim 21, wherein the means for identifying the one or more blocks comprises means for identifying a first left-neighboring first block and a second left-neighboring block that is positioned below the block.

25. The method of claim 1, further comprising:
- determining, for a second block of video data that is included in the second largest coded unit and that is positioned below current block and that neighbors the current block, a most probable intra-prediction mode for predicting an intra-prediction mode of the second block based on the intra-prediction most of the current block; and
- coding data that indicates the intra-prediction mode of the second block based on the most-probable intra-prediction mode.

26. The apparatus of claim 9, wherein the one or more processors are further configured to:
- determine, for a second block of video data that is included in the second largest coded unit and that is positioned below current block and that neighbors the current block, a most probable intra-prediction mode for predicting an intra-prediction mode of the second block based on the intra-prediction most of the current block; and
- code data that indicates the intra-prediction mode of the second block based on the most-probable intra-prediction mode.

27. The non-transitory computer-readable medium of claim 17, wherein the instructions further cause the one or more processors to:
- determine, for a second block of video data that is included in the second largest coded unit and that is positioned below current block and that neighbors the current block, a most probable intra-prediction mode for predicting an intra-prediction mode of the second block based on the intra-prediction most of the current block; and
- code data that indicates the intra-prediction mode of the second block based on the most-probable intra-prediction mode.

28. The apparatus of claim 21, wherein the apparatus further comprises:
- means for determining, for a second block of video data that is included in the second largest coded unit and that is positioned below current block and that neighbors the current block, a most probable intra-prediction mode for predicting an intra-prediction mode of the second block based on the intra-prediction most of the current block; and
- means for coding data that indicates the intra-prediction mode of the second block based on the most-probable intra-prediction mode.

29. The apparatus of claim 9, further comprising a display configured to display an image that includes the slice of video data.

30. The apparatus of claim 9, further comprising a camera configured to capture an image that includes the slice of video data.

* * * * *